United States Patent
Koyama

(10) Patent No.: US 8,487,844 B2
(45) Date of Patent: Jul. 16, 2013

(54) EL DISPLAY DEVICE AND ELECTRONIC DEVICE INCLUDING THE SAME

(75) Inventor: Jun Koyama, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 146 days.

(21) Appl. No.: 13/212,224

(22) Filed: Aug. 18, 2011

(65) Prior Publication Data

US 2012/0056537 A1    Mar. 8, 2012

(30) Foreign Application Priority Data

Sep. 8, 2010  (JP) ................................ 2010-200435

(51) Int. Cl.
*G09G 3/30* (2006.01)
*G09G 3/10* (2006.01)

(52) U.S. Cl.
USPC ........................................ 345/76; 315/169.3

(58) Field of Classification Search
USPC ................... 315/169.1, 169.3, 170, 172, 173, 315/174; 345/76, 77, 78, 80, 82, 84, 87, 204, 345/205, 206, 698, 699
See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Kamiya et al., "Carrier transport properties and electronic structures of amorphous oxide semiconductors: the present status,", Solid State Physics, Sep. 1, 2009, vol. 44, No. 9, pp. 621-633, Agne Gijutsu Center.

(Continued)

*Primary Examiner* — Minh D A
(74) *Attorney, Agent, or Firm* — Eric J. Robinson; Robinson Intellectual Property Law Office, P.C.

(57) ABSTRACT

An object is to suppress luminance variation due to change in the amount of current flowing through a light-emitting element, caused by change in environmental temperature. A monitor circuit for compensating the cathode potential of the light-emitting element in accordance with environmental temperature is provided in the vicinity of a pixel portion in order to compensate a change in properties, due to environmental temperature, of a transistor including an oxide semiconductor layer and the light-emitting element. The monitor circuit includes a monitor power supply line, a monitor transistor including an oxide semiconductor layer, a monitor light-emitting element, a current source circuit, and an amplification circuit that compensates the cathode potential of the light-emitting element. The potential of the monitor power supply line is lower than the potential of a power supply line in the pixel.

19 Claims, 10 Drawing Sheets

U.S. PATENT DOCUMENTS

| | | |
|---|---|---|
| 7,211,825 B2 | 5/2007 | Shih et al |
| 7,221,338 B2 | 5/2007 | Yamazaki et al. |
| 7,245,297 B2 | 7/2007 | Kimura et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,482,629 B2 * | 1/2009 | Hayakawa et al. ............ 257/59 |
| 7,501,293 B2 | 3/2009 | Ito et al. |
| 7,623,099 B2 * | 11/2009 | Yamazaki et al. ............ 345/77 |
| 7,674,650 B2 | 3/2010 | Akimoto et al. |
| 7,732,819 B2 | 6/2010 | Akimoto et al. |
| 7,834,355 B2 * | 11/2010 | Hayakawa et al. ............ 257/59 |
| 7,990,348 B2 * | 8/2011 | Yamazaki et al. ............ 345/77 |
| 8,111,215 B2 * | 2/2012 | Kimura et al. .................. 345/76 |
| 8,284,127 B2 * | 10/2012 | Koyama ........................ 345/76 |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0038501 A1 | 2/2006 | Koyama et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0017996 A1 | 1/2011 | Den et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-186319 A | 7/2006 |
| WO | WO-2004/114391 | 12/2004 |

OTHER PUBLICATIONS

Fortunato.E et al., "Wide-Bandgap High-Mobility ZNO Thin-Film Transistors Produced At Room Temperature,", Appl. Phys. Lett . (Applied Physics Letters), Sep. 27, 2004, vol. 85, No. 13, pp. 2541-2543.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In-Ga-Zn-O TFTS,", SID Digest '08: SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3-Ga2ZnO4-ZnO system at 1350° C.,", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, pp. 1624-1630.

Asakuma.N. et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In-Ga-Zn-Oxide TFT,", SID Digest '09 : SID Internatonal Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In, Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3-In2O3-ZnO) TFT,", SID Digest '08 : SID International Symposium Digest of Technical Papers, May 20, 2008, vol. 39, pp. 633-636.

Lee.J et al., "World's Largest (15-inch) XGA AMLCD Panel Using IGZO Oxide TFT,", SID Digest '08 : SID International Symposium Digest of Technical Papers, May 20, 2008, vol. 39, pp. 625-628.

Nowartari.H et al., "60.2: Intermediate Connector with Suppressed Voltage Loss for White Tandem OLEDS,", SID Digest '09 : SID International Symposium Digest for Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs,", IDW'02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In-Ga-Zn-O TFTs for Flat Panel Displays, ", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array, ", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of Internatinal Electron Devices Meeting, Dec. 7, 2009, pp. 191-194.

Kurokawa.Y et al., "UHF RFCPUS on Flexible and Glass Substrates for Secure RFID Systems,", Journal of Sold-State Circuits , 2008, vol. 43, No. 1, pp. 292-299.

Ohara.H et al., "Amorphous In-Ga-Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physcis.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:AL and SN-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In-Ga-Zn-Oxide TFTS,", IDW '09 : Proceedings of the 16th International Display Workshops, 2009, pp. 689-692.

Park.J et al., "Amorphous Indium-Gallium-Zinc Oxide TFTS and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZNO TFT,", IMID '07 Digest, 2007, pp. 1249-1252.

Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.

Osada.T et al., "Development of Driver-Integrated Panel Using Amorphous In-Ga-Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZNO TFTS) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In-Ga-Zn-Oxide TFT,", SID Digest '09 : SID International Symposium Digest of Technical Papers, May 31, 2009, pp. 1110-1112.

Ohara.H et al., "21.3:4.0 In. QVGA AMOLED Display Using In-Ga-Zn-Oxide TFTS With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N. et al., "SPINEL,YBFE2O4, and YB2FE3O7 Types of Structures for Compounds in the IN2O3 and SC2O3-A2O3-BO Systems [A; Fe, Ga, or Al; B: Mg, Mn, Fe, Ni, Cu,or Zn] At Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics), 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters), 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

* cited by examiner

EL DISPLAY DEVICE AND ELECTRONIC DEVICE INCLUDING THE SAME

BACKGROUND OF THE INVENTION

1. Field of the Invention

The technical field relates to a display device including an electroluminescent element (hereinafter referred to as an EL display device).

2. Description of the Related Art

In recent years, EL display devices including light-emitting elements typified by organic EL elements have been developed. EL display devices are expected to be used in a wide range of applications, using their advantages of being self light-emitting devices, such as high image quality, wide viewing angle, thinness, and lightness. In an EL display device, a light-emitting element and a transistor are provided in each pixel, and light emission of the light-emitting element is controlled with the transistor.

As a transistor for controlling light emission of a light-emitting element, a transistor including a semiconductor layer containing a metal oxide having semiconductor characteristics (hereinafter referred to as an oxide semiconductor) has attracted attention (e.g., see Patent Document 1). The luminance of the light-emitting element is proportional to the amount of current. As an example of a method for driving an EL display device, there is a driving method by which desired luminance is obtained by controlling voltage applied to a transistor and supplying current to a light-emitting element. In order to accurately express gray levels with this driving method, constant current needs to flow through the light-emitting element by controlling current by the transistor.

REFERENCE

Patent Document 1: Japanese Published Patent Application No. 2006-186319

SUMMARY OF THE INVENTION

The case where a transistor including a semiconductor layer containing an oxide semiconductor is used as a transistor connected to a light-emitting element in an EL display device will be described. Here, the case where the transistor including a semiconductor layer containing an oxide semiconductor is an n-channel transistor is described.

FIG. 10A illustrates a circuit configuration of a pixel that includes transistors each including a semiconductor layer containing an oxide semiconductor and a light-emitting element. A pixel 3000 includes a first transistor (also referred to as a selection transistor) 3001, a second transistor (also referred to as a driving transistor) 3002, and a light-emitting element 3003. A signal line 3004 to which an image signal is input and a gate terminal of the second transistor 3002 are connected to each other through the first transistor 3001. A gate line 3005 is connected to a gate terminal of the first transistor 3001. The second transistor 3002 and the light-emitting element 3003 are connected between a power supply line (also referred to as a first power supply line) 3006 and a power supply line (also referred to as a second power supply line) 3007. When Vel>Vss is satisfied where Vel denotes a potential of the power supply line 3006 and Vss denotes a potential of the power supply line 3007, current flows from the power supply line 3006 toward the power supply line 3007. The light-emitting element 3003 emits light in accordance with the amount of current flowing therethrough.

Note that in the circuit diagram in FIG. 10A, "OS" is written for the symbol of a transistor including a semiconductor layer containing an oxide semiconductor for clear distinction. For example, in FIG. 10A, each of the first transistor 3001 and the second transistor 3002 is a transistor including a semiconductor layer containing an oxide semiconductor.

Next, the operation of the pixel 3000 in FIG. 10A will be described. The potential of the gate line is set at a H-level potential to turn on the first transistor 3001, and the potential (Vsig) of the signal line is held at the gate of the second transistor 3002 through the first transistor 3001. A current corresponding to the potential held at the gate of the second transistor 3002 flows between a source and a drain of the second transistor 3002 and between an anode and a cathode of the light-emitting element 3003. At that time, Formula 1 is satisfied where Vsig is a gate potential of the second transistor 3002, Vss is a potential of the power supply line 3007, Vgs is a voltage between the gate and source of the second transistor 3002, and Vac is a voltage between the anode and cathode of the light-emitting element 3003.

$$Vsig - Vss = Vgs + Vac \qquad (1)$$

In consideration of Formula 1 and voltage-current characteristics of the light-emitting element 3003, the gate potential of the second transistor 3002 and the potential of the power supply line 3007 are set. Then, Vgs (the voltage between the gate and source of the second transistor 3002) and Vac (the voltage between the anode and cathode of the light-emitting element 3003) are determined, and constant current flows through the light-emitting element 3003 and desired luminance can be obtained.

The resistance (internal resistance) of the light-emitting element 3003 is changed in accordance with ambient temperature (hereinafter referred to as environmental temperature). Specifically, when room temperature is normal temperature, the resistance is decreased if the temperature is higher than the normal temperature, and is increased if the temperature is lower than the normal temperature. Therefore, voltage-current characteristics are changed in accordance with environmental temperature. Specifically, when the temperature rises, the amount of current is increased and the luminance is higher than desired luminance. When the temperature decreases and the same voltage is applied, the amount of current is reduced and the luminance of the light-emitting element 3003 is lower than desired luminance. The properties of the light-emitting element are as shown by curves of voltage-current characteristics of the light-emitting element at plural temperatures (50° C., 25° C., and 0° C.) (see FIG. 10B).

The threshold voltage (Vth) of the second transistor 3002 including a semiconductor layer containing an oxide semiconductor is changed depending on environmental temperature. Specifically, when room temperature is normal temperature, the threshold voltage is decreased if the temperature is higher than the normal temperature, and is increased if the temperature is lower than the normal temperature. Therefore, when the temperature rises and the same voltage is applied to the gate of the second transistor 3002, the amount of current flowing through the second transistor 3002 is increased and the luminance of the light-emitting element 3003 is higher than desired luminance. On the other hand, when the temperature decreases and the same voltage is applied to the gate of the second transistor 3002, the amount of current flowing through the second transistor 3002 is reduced and the luminance of the light-emitting element 3003 is lower than desired luminance. The properties of the transistor including a semiconductor layer containing an oxide semiconductor are as shown by a graph of the relation between the threshold voltage Vth (V) of the second transistor 3002 including a semiconductor layer containing an oxide semiconductor and temperature (° C.) (see FIG. 10C).

Therefore, because of the above properties of the light-emitting element and the second transistor 3002 including a semiconductor layer containing an oxide semiconductor with respect to environmental temperature, Vgs (the voltage between the gate and source of the second transistor 3002) and Vac (the voltage between the anode and cathode of the light-emitting element 3003) in Formula 1 are varied. As a result, the luminance of the light-emitting element 3003 is varied when the environmental temperature is changed, and it is necessary to compensate Vsig (the gate potential of the second transistor 3002) and/or Vss (the potential of the power supply line 3007) in accordance with change in environmental temperature.

In view of the above, an object of one embodiment of the present invention is to suppress luminance variation due to change in the amount of current flowing through a light-emitting element, which is caused by change in environmental temperature.

In one embodiment of the present invention, a monitor circuit for compensating the cathode potential of a light-emitting element in accordance with environmental temperature is provided in the vicinity of a pixel portion in order to compensate a change in properties, due to environmental temperature, of a transistor including a semiconductor layer containing an oxide semiconductor and the light-emitting element that are provided in each pixel of an EL display device. The monitor circuit includes a monitor power supply line, a monitor transistor having a first terminal and a gate that are connected to the monitor power supply line and including a semiconductor layer containing an oxide semiconductor, a monitor light-emitting element connected to the monitor transistor, a current source circuit connected to the monitor light-emitting element, and an amplification circuit that compensates the cathode potential of the light-emitting element in accordance with a voltage applied to the monitor light-emitting element and the monitor transistor. The potential of the monitor power supply line is lower than the potential of a power supply line in the pixel.

One embodiment of the present invention is an EL display device including a monitor circuit and a pixel. The monitor circuit includes a monitor power supply line, a monitor transistor having a first terminal and a gate that are electrically connected to the monitor power supply line, a monitor light-emitting element having a first electrode electrically connected to a second terminal of the monitor transistor, a current source circuit electrically connected to a second electrode of the monitor light-emitting element, and a voltage follower circuit having an input terminal electrically connected to the second electrode of the monitor light-emitting element. The pixel includes a light-emitting element having a first electrode electrically connected to an output terminal of the voltage follower circuit; and a driving transistor having a first terminal electrically connected to a second electrode of the light-emitting element, a second terminal electrically connected to a power supply line, and a gate electrically connected to a signal line through a selection transistor. The monitor transistor and the driving transistor each include a semiconductor layer containing an oxide semiconductor. The potential of the monitor power supply line is lower than the potential of the power supply line.

In the EL display device according to one embodiment of the present invention, the potential of the power supply line may be different depending on a light-emitting material of the light-emitting element.

In the EL display device according to one embodiment of the present invention, the driving transistor and the monitor transistor may operate in a saturation region.

In the EL display device according to one embodiment of the present invention, the pixel may include a capacitor having a first electrode electrically connected to the power supply line, and a second electrode electrically connected to the gate of the driving transistor.

In the EL display device according to one embodiment of the present invention, the driving transistor and the monitor transistor may be n-channel transistors.

In the EL display device according to one embodiment of the present invention, the potential of the output terminal of the voltage follower circuit may be lower than the potential of the monitor power supply line and the potential of the power supply line.

According to one embodiment of the present invention, luminance variation due to change in the amount of current flowing through a light-emitting element, which is caused by change in environmental temperature, can be suppressed.

DETAILED DESCRIPTION OF THE INVENTION

Figure 1A:
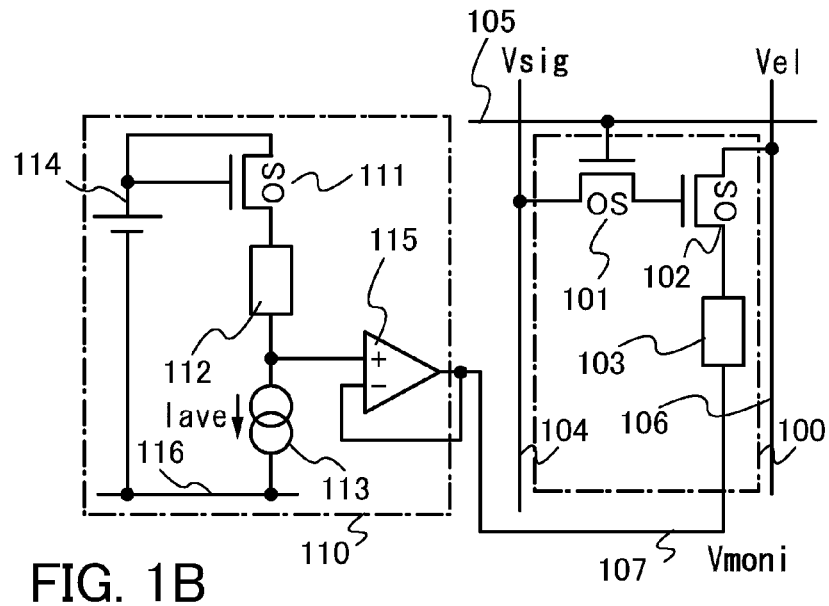
FIGS. 1A to 1C are diagrams for explaining one embodiment of the present invention.

Embodiments of the present invention will be hereinafter described with reference to the accompanying drawings. Note that the present invention can be carried out in many different modes, and it is easily understood by those skilled in the art that modes and details of the present invention can be modified in various ways without departing from the spirit and scope of the present invention. Therefore, the present invention should not be interpreted as being limited to the description of the embodiments. Note that in the structure of the present invention described below, identical portions are denoted by the same reference numerals.

Note that the size, the thickness of a layer, and signal waveform of components illustrated in the drawings and the like in the embodiments are exaggerated for simplicity in some cases. Therefore, embodiments of the present invention are not limited to such scales.

Note that terms "first", "second", "third" to "N-th" (N is a natural number) employed in this specification are used in order to avoid confusion between components, and thus do not limit the number of components.

Embodiment 1

In this embodiment, an example of an EL display device which is one embodiment of the present invention will be described with reference to FIGS. 1A to 1C, FIGS. 2A and 2B, FIG. 3, and FIG. 4.

FIG. 1A illustrates a circuit configuration of a pixel including transistors including a semiconductor layer containing an oxide semiconductor and a light-emitting element, and a monitor circuit for compensating change in the amount of current flowing through the light-emitting element, which is caused by change in environmental temperature.

A pixel 100 includes a first transistor (also referred to as a selection transistor) 101, a second transistor (also referred to as a driving transistor) 102, and a light-emitting element 103. A signal line 104 to which an image signal is input and a gate terminal of the second transistor 102 are connected to each other through the first transistor 101. A gate line 105 is connected to a gate terminal of the first transistor 101. The second transistor 102 and the light-emitting element 103 are connected between a power supply line (also referred to as a first power supply line) 106 and a power supply line (also referred to as a second power supply line) 107 that is connected to a cathode of the light-emitting element 103. When Vel>Vmoni is satisfied where Vel is a potential of the power supply line 106 and Vmoni is a potential of the power supply line 107, current flows from the power supply line 106 toward the power supply line 107. The light-emitting element 103 emits light in accordance with the amount of current flowing therethrough.

Note that in circuit diagrams in this specification, "OS" is written for the symbol of a transistor including a semiconductor layer containing an oxide semiconductor for clear distinction.

Note that when it is explicitly described that "A and B are connected," the case where A and B are electrically connected, the case where A and B are functionally connected, and the case where A and B are directly connected are included therein.

In the configuration of the pixel 100, when the potentials of the power supply lines 106 and 107 are fixed, the properties of the light-emitting element 103 and the second transistor 102 are changed in accordance with environmental temperature as described above.

Specifically, when the environmental temperature decreases, the resistance of the light-emitting element 103 is increased, and the amount of current flowing therethrough is reduced even if the same voltage is applied. On the other hand, when the environmental temperature rises, the resistance of the light-emitting element 103 is decreased, and the amount of current flowing therethrough is increased even if the same voltage is applied.

Similarly, when the environmental temperature decreases, the threshold voltage Vth of the second transistor 102 is increased, and the amount of current flowing therethrough is reduced even if the same gate voltage is applied. On the other hand, when the environmental temperature rises, the threshold voltage Vth of the second transistor 102 is decreased, and the amount of current flowing therethrough is increased even if the same gate voltage is applied.

In view of the above, the adverse effect of variation in properties due to environmental temperature is compensated with a monitor circuit. In this embodiment, the monitor circuit adjusts Vmoni, which is the potential of the power supply line 107, in accordance with environmental temperature, thereby compensating change in the amount of current flowing through the light-emitting element 103 and the second transistor 102 due to environmental temperature.

Note that the potential (Vsig) applied to the gate of the second transistor 102 is higher as the gray level of an image signal supplied to a pixel is higher. Vsig is varied in accordance with an image signal. The potential of each terminal of the second transistor 102 is set so that the amount of current flowing through the light-emitting element 103 is increased when the potential Vsig is higher.

The potential Vel of the power supply line 106 connected to the second transistor 102 is set so that Vds (the voltage between the drain and source of the second transistor 102) is higher than Vgs (the voltage between the gate and source of the second transistor 102) at the time of applying Vsig to the gate of the second transistor 102. That is, the potential of each terminal of the second transistor 102 is set so that the second transistor 102 is operated in a saturation region. Here, Vsig applied to the gate of the second transistor 102 is a signal whose potential is increased in accordance with the gray level of an image signal. Accordingly, Vel is set higher than the potential Vsig applied to the gate of the second transistor 102 at the time when the gray level of an image signal is at the maximum.

Next, the configuration of the monitor circuit 110 will be described. The monitor circuit 110 includes a third transistor (also referred to as a monitor transistor) 111, a monitor light-emitting element 112, a current source circuit 113, a monitor power supply line (also referred to as a third power supply line) 114, a voltage follower circuit 115, and a low power potential line (also referred to as a fourth power supply line) 116. A gate terminal and a drain terminal of the third transistor 111 are connected to the monitor power supply line 114. The third transistor 111, the monitor light-emitting element 112, and the current source circuit 113 are connected between the monitor power supply line 114 and the low power potential line 116 connected to the low potential side of the current source circuit 113. An input terminal of the voltage follower circuit 115 is connected to a node to which the monitor light-emitting element 112 and the current source circuit 113 are connected. An output terminal of the voltage follower circuit 115 is connected to the power supply line 107. Consequently, the potential Vmoni of the power supply line 107 is controlled with an output potential of the voltage follower circuit 115.

Figure 1B:
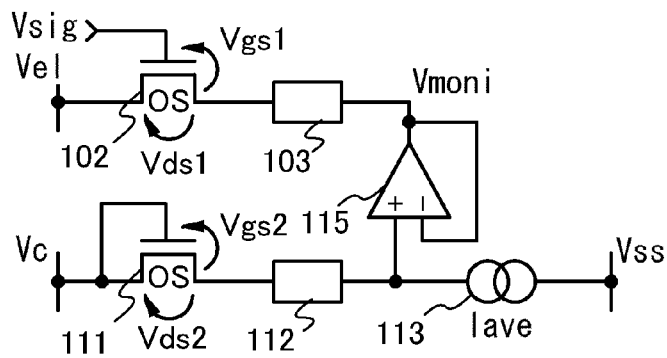

Next, the operation of the monitor circuit 110 will be described using a circuit diagram in FIG. 1B in addition the circuit diagram in FIG. 1A. Note that the circuit diagram in FIG. 1B is equivalent to that in FIG. 1A. In FIG. 1B, Vgs1 is the voltage between the gate and source of the second transistor 102; Vds1 is the voltage between the drain and source of the second transistor 102; Vgs2 is the voltage between the gate and source of the third transistor 111; and Vds2 is the voltage between the drain and source of the third transistor 111.

First, the current source circuit 113 supplies a current that is necessary to flow through the light-emitting element 103 in the case where the light-emitting element 103 emits light with a gray level that is frequently expressed in an EL display device, for example, a gray level that is approximately 30% of the maximum gray level. The current value at this time is denoted by Iave. Then, a potential Vc having a level needed to make the current Iave flow is applied to the gate terminal of the third transistor 111. When Vc>Vss, the current Iave flows from the monitor power supply line 114 toward the low power potential line 116. By reducing the amount of current supplied from the current source circuit 113 to 30% of the current supplied for the maximum gray level, lower power consumption of the monitor circuit 110 can be achieved.

Figure 2A:
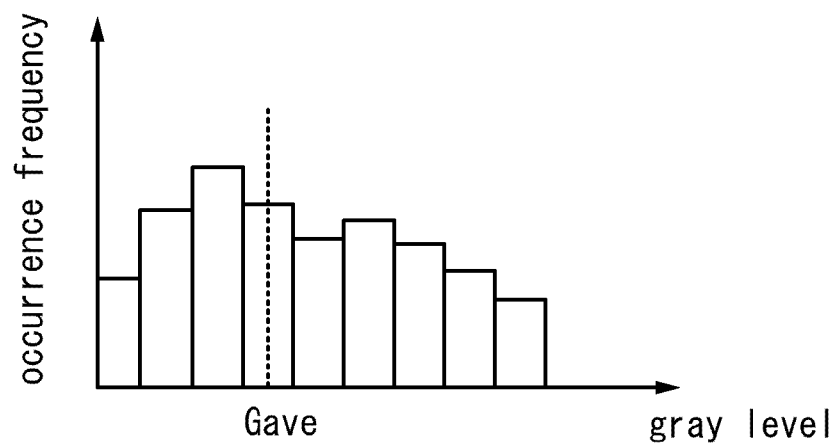
FIGS. 2A and 2B are graphs for explaining one embodiment of the present invention.

The current Iave is described as a current value with which the light-emitting element emits light with the gray level that is approximately 30% of the maximum gray level; however, this embodiment is not limited to this. For example, in the case where a histogram of gray levels (gray level on the horizontal axis and occurrence frequency of gray level on the vertical axis) is constructed as shown in FIG. 2A to obtain Gave which is the average gray level, Iave may be a current value that is to flow through the light-emitting element in order to obtain the gray level Gave. In that case, the average gray level Gave of image signals is detected at regular intervals to set Iave.

Note that in the case where a current supplied from the current source circuit is set corresponding to the maximum gray level, the current source circuit outputs a potential that is highly compensated. Such a potential has an advantage of making burn-in in pixels (luminance unevenness due to variation in the degree of deterioration between pixels) less noticeable. Thus, the current value may be changed as appropriate.

Figure 2B:
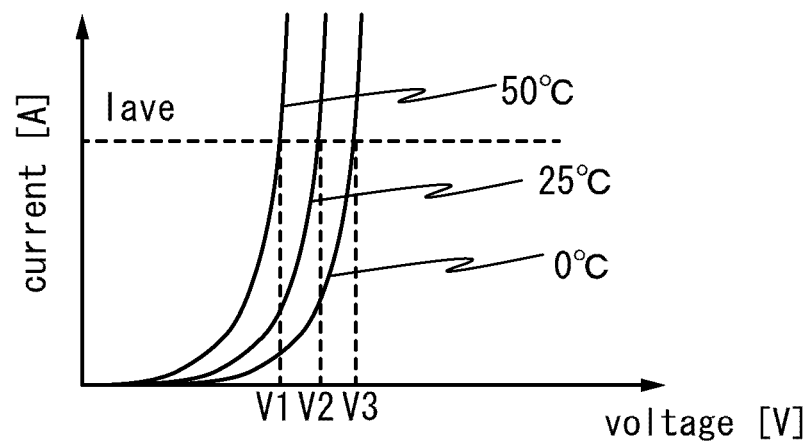

By fixing the current flowing through the power source circuit 113 at Iave, the current Iave flows from the monitor power supply line 114 toward the low power potential line 116. Thus, the same current Iave flows through the third transistor 111 and the monitor light-emitting element 112. FIG. 2B shows voltage-current characteristics of the light-emitting element. When the current Iave flows through the power source circuit 113, the current Iave can flow through the monitor light-emitting element 112 even if the properties of the monitor light-emitting element 112 are changed in accordance with environmental temperature. Thus, the same luminance can be obtained with the light-emitting element even when the environmental temperature is changed, and a change (V1 to V3) in Vac applied to the opposite terminals of the monitor light-emitting element 112 at the time when the environmental temperature is changed can be monitored. Similarly, the current Iave can also flow through the third transistor 111, and the voltage between the terminals of the third transistor 111 is set so that the same current Iave flows through the third transistor 111 even if the environmental temperature is changed and the threshold voltage is varied.

The current Iave flows from the monitor power supply line 114 toward the low power potential line 116, whereby Vgs2 of the third transistor 111 and the voltage Vac between the opposite terminals of the monitor light-emitting element 112 become the voltage needed to supply the current Iave. Even if the threshold voltage Vth of the third transistor 111 and the voltage Vac between the opposite terminals of the monitor light-emitting element 112 are changed by the change of the environmental temperature, the source potential of the third transistor 111 and the cathode potential of the monitor light-emitting element 112 are also changed, and the cathode potential of the monitor light-emitting element 112, which has an appropriate amount for supplying the current Iave, can be monitored.

The monitored potential is input to the non-inverting input terminal which is the input terminal of the voltage follower circuit 115. The potential Vmoni of the output terminal of the voltage follower circuit 115, that is, of the power supply line 107, which is influenced by the change in properties in the pixel 100 due to the environmental temperature, can be compensated by the monitor circuit 110. Thus, changes in the voltage-current characteristics of the light-emitting element 103 and the threshold voltage of the second transistor 102 due to the environmental temperature are compensated.

Note that the voltage follower circuit is one of amplification circuits. The voltage follower circuit can be any circuit that outputs a voltage corresponding to an inputted current, and can be constituted by, for example, an operational amplifier, a bipolar transistor, or a MOS transistor or a combination of such elements.

Figure 1C:
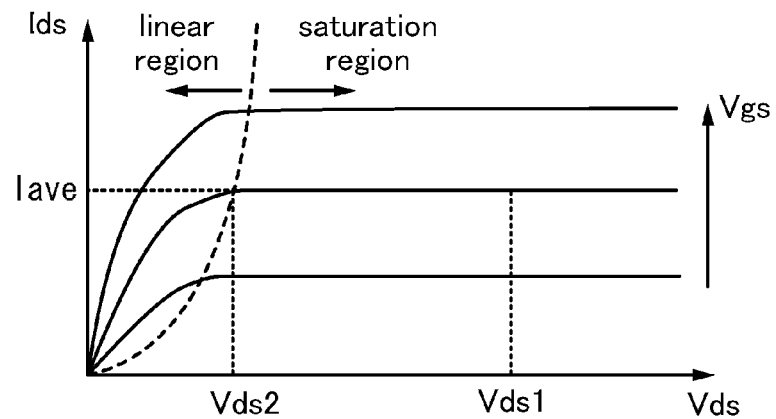

Note that since the gate and drain of the third transistor 111 are connected to each other when the current Iave flows through the third transistor 111, Vgs2 is the same as Vds2. Furthermore, the third transistor 111 operates in the saturation region since its gate and drain are connected to each other. FIG. 1C shows a graph of a voltage Vds between the drain and source and a current Ids flowing between the drain and source. As seen from FIG. 1C, when the transistor operates in the saturation region, the voltage Vds between the drain and source does not need to be constant as long as the current Ids flowing between the drain and source is constant.

Further, as described above, the second transistor 102 provided in the pixel 100 is also operated in the saturation region by setting the potential Vel higher than the potential Vsig. Thus, Vds1 of the second transistor 102 is set higher than Vds2 of the third transistor 111. The amount of current flowing through the transistor operating in the saturation region is hardly changed if Vds is changed. Consequently, even when the potential of the monitor power supply line 114 in the monitor circuit 110 is made lower than the potential of the power supply line 106 in the pixel 100, the cathode potential of the monitor light-emitting element 112, which has an appropriate amount for supplying the current Iave, can be monitored, and Vmoni which is the cathode potential of the light-emitting element can be compensated. As a result, lower power consumption of the monitor circuit 110 can be realized. Note that at this time, the potential Vmoni of the power supply line 107 is lower than the potential of the monitor power supply line 114 and the potential of the power supply line 106, and a current flows in a predetermined direction in both the pixel and the monitor circuit.

In order to increase the luminance of the light-emitting element 103 in the pixel 100, the potential Vsig of an image signal can be increased to increase Vgs1 in the case where the second transistor 102 operates in the saturation region. In this embodiment, the potential of the power supply line 107 connected to the cathode of the light-emitting element 103 is compensated. It is therefore not necessary to compensate the potential Vsig of the image signal for increasing the luminance of the light-emitting element.

Note that the monitor light-emitting element 112 and the third transistor 111 are preferably formed over the same substrate through the same formation process at the same time as the light-emitting element 103 and the second transistor 102. This is because accurate compensation cannot be carried out if properties of the monitor light-emitting element 112 and the third transistor 111 provided in the monitor circuit 110 are different form those of the light-emitting element 103 and the second transistor 102 provided in the pixel 100.

Each of the first transistor 101, the second transistor 102, and the third transistor 111 is a transistor including a semiconductor layer containing an oxide semiconductor. Specifically, the semiconductor layer is preferably formed using an oxide semiconductor containing Zn—O. In this case, the transistor is an n-channel transistor. The transistor including a semiconductor layer containing an oxide semiconductor has an extremely low off-state current which is a current flowing through the transistor in the off state (non-conduction state).

Therefore, it is possible that a capacitor is not provided for the gate of the second transistor 102.

Note that a capacitor may be provided in order to hold the image signal Vsig input to the gate of the second transistor 102. Specifically, a capacitor may be provided between the gate and drain of the second transistor 102. Alternatively, a capacitor may be provided between the gate and source of the second transistor 102. Further alternatively, a capacitor may be provided between the gate of the second transistor 102 and another wiring. Note that another wiring refers to a wiring for forming a capacitor or a gate line connected to a pixel in the previous stage.

Figure 3:
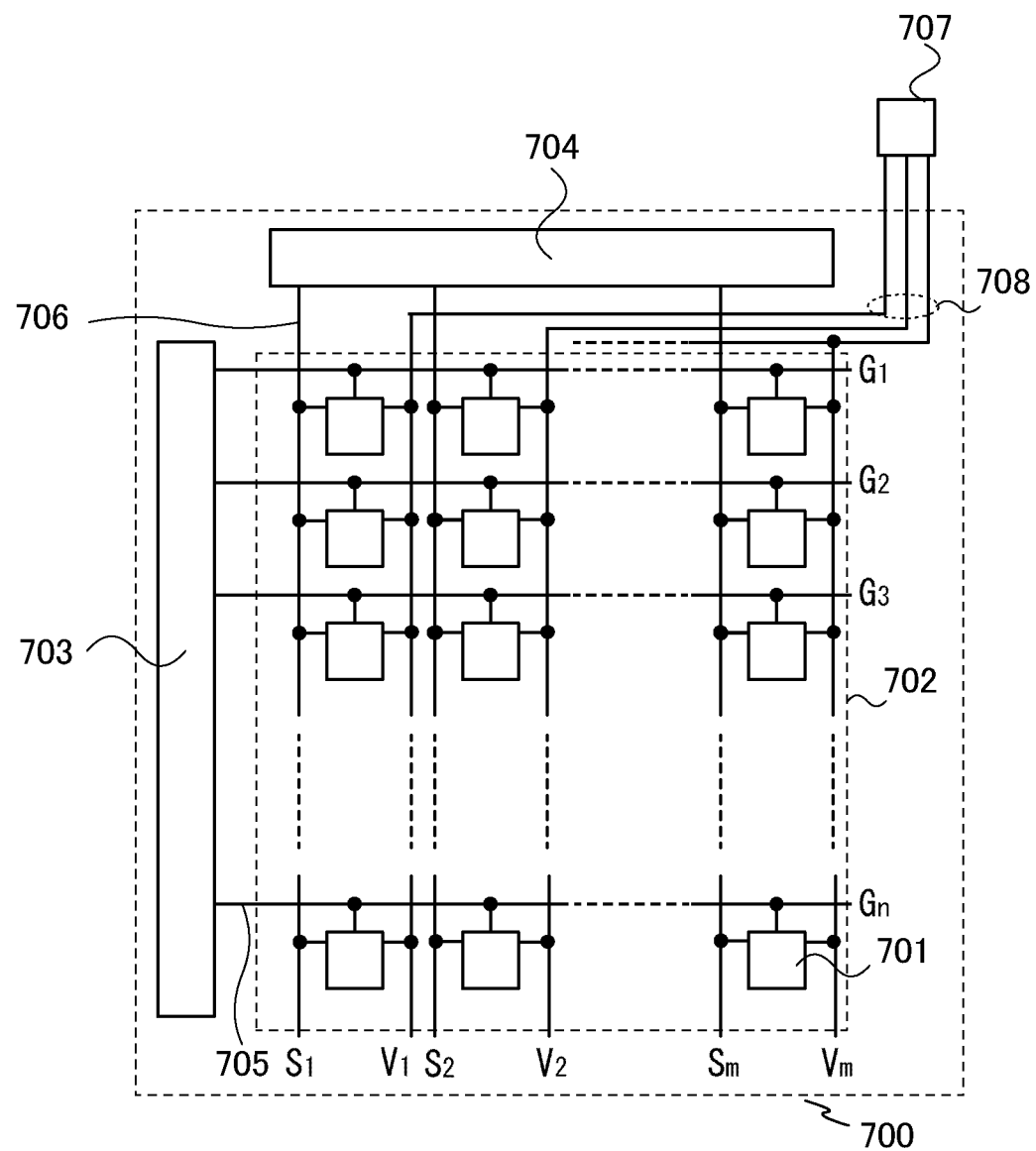
FIG. 3 is a block diagram for explaining one embodiment of the present invention.

Note that the pixel 100 in FIG. 1A is placed in a matrix like a plurality of pixels 701 over a substrate 700 illustrated in FIG. 3. FIG. 3 illustrates a structure in which a pixel portion 702, a gate line driver circuit 703, and a signal line driver circuit 704 are provided over the substrate 700. A selected state or a non-selected state of the pixels 701 is decided every row in accordance with a selection signal supplied from a gate line 705 connected to the gate line driver circuit 703. The pixel 701 selected by the selection signal is supplied with a video voltage (also referred to as an image signal, a video signal, or video data) from a signal line 706 connected to the signal line driver circuit 704. Further, the pixel 701 is connected to a power supply line 708 that is extended from a power supply circuit 707 provided outside the substrate 700.

Note that in FIG. 3, the gate lines 705 are denoted by $G_1$ to $G_n$ (n is a natural number), the signal lines 706 are denoted by $S_1$ to $S_m$ (m is a natural number), and the power supply lines 708 are denoted by $V_1$ to $V_m$ (m is a natural number). In the case where a driving voltage of a light-emitting element varies between color elements, the power supply lines $V_1$ to $V_m$ for supplying a power supply voltage to each pixel apply different power supply voltages depending on colors by extending a plurality of power supply lines 708 from the power supply circuit 707 as illustrated in FIG. 3.

FIG. 3 illustrates the structure in which the gate line driver circuit 703 and the signal line driver circuit 704 are provided over the substrate 700; alternatively, one of the gate line driver circuit 703 and the signal line driver circuit 704 may be provided over the substrate 700. Moreover, only the pixel portion 702 may be provided over the substrate 700. Furthermore, FIG. 3 illustrates the structure in which the power supply circuit 707 is provided outside the substrate 700; alternatively, the power supply circuit 707 may be provided over the substrate 700.

FIG. 3 illustrates the example in which the plurality of pixels 701 are arranged in a matrix (in stripe) in the pixel portion 702. Note that the pixels 701 are not necessarily arranged in a matrix and may be arranged in a delta pattern or Bayer arrangement, for example. Note that color elements controlled in the pixel at the time of color display are not limited to three colors of R, G, and B (R, G, and B correspond to red, green, and blue), and color elements of more than three colors may be employed, for example, R, G, B, and W (W corresponds to white) or R, G, B, and one or more of yellow, cyan, magenta, and the like. Further, the size of display regions may be different between dots of color elements.

FIG. 3 illustrates the gate lines 705, the signal lines 706, and the power supply lines 708 corresponding to the number of pixels in the row and column directions. Note that the number of the gate lines 705, the signal lines 706, and the power supply lines 708 may be increased in accordance with the number of sub-pixels included in the pixels or the number of transistors in the pixel. The pixels 701 may be driven with the gate lines 705, the signal lines 706, and the power supply lines 708 shared with some pixels.

Figure 4:
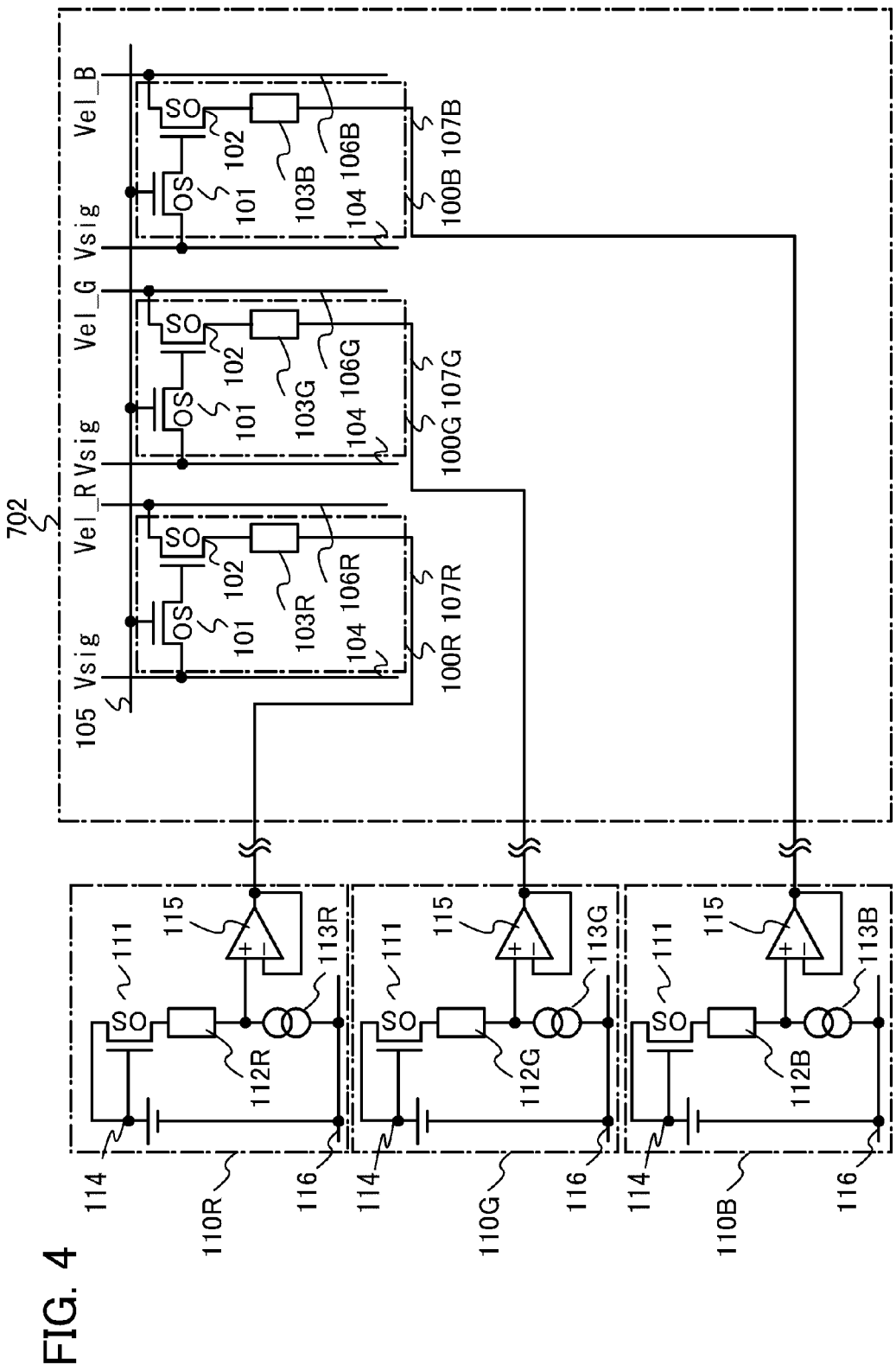
FIG. 4 is a circuit diagram for explaining one embodiment of the present invention.

As shown in FIG. 3, in some EL display devices, color images are displayed with light-emitting elements of three primary colors of RGB. Therefore, properties with respect to environmental temperature are varied between the light-emitting elements, so that monitor circuits are preferably provided corresponding to materials of the light-emitting elements. FIG. 4 illustrates a specific circuit configuration. FIG. 4 illustrates a pixel 100R including a light-emitting element 103R that emits red (R) light, a pixel 100G including a light-emitting element 103G that emits green (G) light, and a pixel 100B including a light-emitting element 103B that emits blue (B) light, which are provided in the pixel portion 702. In addition, a monitor circuit 110R for monitoring a change in properties with respect to environmental temperature of the light-emitting element 103R, a monitor circuit 110G for monitoring a change in properties with respect to environmental temperature of the light-emitting element 103G, and a monitor circuit 110B for monitoring a change in properties with respect to environmental temperature of the light-emitting element 103B are provided in the vicinity of the pixel portion 702 in FIG. 4.

Since properties of light-emitting elements are different depending on colors in the structure in FIG. 4, different power supply lines 106R, 106G, and 106B are provided in the pixels 100R, 100G, and 100B as described using FIG. 3. The monitor circuit 110R connected to the cathode side of the light-emitting element 103R through the power supply line 107R includes a red monitor light-emitting element 112R and a current source circuit 113R. The monitor circuit 110G connected to the cathode side of the light-emitting element 103G through the power supply line 107G includes a green monitor light-emitting element 112G and a current source circuit 113G. The monitor circuit 110B connected to the cathode side of the light-emitting element 103B through the power supply line 107B includes a blue monitor light-emitting element 112B and a current source circuit 113B. Note that the operations of the elements for monitoring and the pixels are similar to those described in FIGS. 1A to 1C.

As has been described, according to one embodiment of the present invention, luminance variation due to change in the amount of current flowing through the light-emitting element, which is caused by change in environmental temperature, can be suppressed. Thus, it is possible to provide an EL display device whose display quality is excellent even if the environmental temperature is changed.

This embodiment can be implemented in combination with any of the structures described in the other embodiments as appropriate.

Embodiment 2

In this embodiment, a structure of a light-emitting element included in each pixel in the EL display device described in Embodiment 1 will be described.

Figure 5:
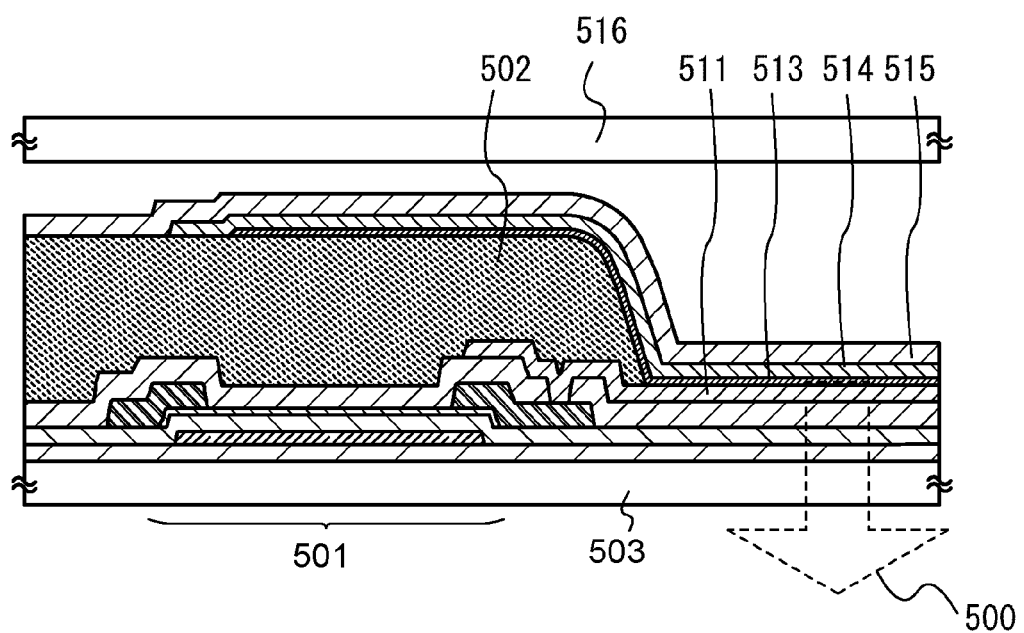
FIG. 5 is a cross-sectional view for explaining one embodiment of the present invention.

FIG. 5 illustrates an embodiment of a cross-sectional structure of a light-emitting element connected to a transistor. The light-emitting element is provided by a stack of a first electrode 511, an EL layer 513 including a light-emitting layer, and a second electrode 514 in this order. One of the first electrode 511 and the second electrode 514 functions as an anode and the other functions as a cathode. Holes injected from the anode and electrons injected from the cathode are recombined in the light-emitting layer included in the EL layer, whereby the light-emitting element emits light. The first electrode 511 of the light-emitting element is connected to a transistor 501 formed over a substrate 503. A partition 502 is provided so as to cover the first electrode 511 and an electrode serving as a source or a drain of the transistor 501.

The EL layer 513 is provided in an opening in the partition 502 over the first electrode 511. The second electrode 514 is provided so as to cover the EL layer 513 and the partition 502.

The first electrode 511 or the second electrode 514 is formed using a metal, an alloy, or a conductive compound.

For example, the first electrode 511 or the second electrode 514 can be formed using a metal, an alloy, a conductive compound, or the like that has a high work function (a work function of 4.0 eV or more). Specifically, it is possible to use a layer of a light-transmitting conductive metal oxide such as indium oxide-tin oxide (ITO: indium tin oxide), indium tin oxide containing silicon or silicon oxide, indium oxide-zinc oxide (IZO: indium zinc oxide), or indium oxide containing tungsten oxide and zinc oxide (IWZO).

In addition, the first electrode 511 or the second electrode 514 can be formed using a metal, an alloy, a conductive compound, or the like that has a low work function (typically, a work function of 3.8 eV or less). Specifically, it is possible to use any of the following materials, for example: elements that belong to Group 1 or Group 2 of the periodic table (i.e., an alkali metal such as lithium and cesium and an alkaline-earth metal such as magnesium, calcium, and strontium) and an alloy of such an element (e.g., an alloy of aluminum, magnesium, and silver and an alloy of aluminum and lithium); and a rare earth metal (e.g., europium and ytterbium) and an alloy of such an element.

A film of an alkali metal, an alkaline-earth metal, or an alloy thereof is formed by vacuum evaporation, sputtering, or the like. Further, silver paste or the like can be applied by an ink jet method and baked to form the first electrode 511 or the second electrode 514. The first electrode 511 and the second electrode 514 are not limited to having a single-layer structure and can have a stacked structure.

In order to extract light emitted from the EL layer 513 to the outside, one of or both the first electrode 511 and the second electrode 514 is/are formed so as to transmit light emitted from the EL layer 513. When only the first electrode 511 has light-transmitting properties, light passes the first electrode 511 in the direction shown by an arrow 500 and is extracted from the substrate 503 side with a luminance corresponding to a video signal input from a signal line. When only the second electrode 514 has light-transmitting properties, light passes the second electrode 514 and is extracted from a sealing substrate 516 side with a luminance corresponding to a video signal input from the signal line. When both the first electrode 511 and the second electrode 514 have light-transmitting properties, light passes the first electrode 511 and the second electrode 514 and is extracted from both the substrate 503 side and the sealing substrate 516 side with a luminance corresponding to a video signal input from the signal line.

For example, the light-transmitting electrode is formed using a light-transmitting conductive metal oxide or formed to a thickness of several nanometers to several tens of nanometers by using silver, aluminum, or the like. Alternatively, the light-transmitting electrode can have a stacked structure including a thin layer of metal such as silver or aluminum and a conductive metal oxide layer with light-transmitting properties.

One of the first electrode 511 and the second electrode 514 that serves as the anode is preferably formed using a metal, an alloy, a conductive compound, or the like that has a high work function (a work function of 4.0 eV or more). The other of the first electrode 511 and the second electrode 514 that serves as the cathode is preferably formed using a metal, an alloy, a conductive compound, or the like that has a low work function (a work function of 3.8 eV or less). Typically, the electrode serving as the cathode can be formed using an alkali metal, an alkaline-earth metal, an alloy or a compound containing such a metal, or transition metal (including a rare earth metal in its category).

The EL layer 513 includes the light-emitting layer. The EL layer 513 may include a hole-injection layer, a hole-transport layer, an electron-transport layer, and an electron-injection layer in addition to the light-emitting layer. The hole-transport layer is provided between the anode and the light-emitting layer. The hole-injection layer is provided between the anode and the light-emitting layer or between the anode and the hole-transport layer. The electron-transport layer is provided between the cathode and the light-emitting layer. The electron-injection layer is provided between the cathode and the light-emitting layer or between the cathode and the electron-transport layer. Note that all the hole-injection layer, the hole-transport layer, the electron-transport layer, and the electron-injection layer are not necessarily provided, and a layer to be provided is selected as appropriate in accordance with a desired function or the like.

The light-emitting layer contains a light-emitting substance. Examples of a light-emitting substance are a fluorescent compound that exhibits fluorescence and a phosphorescent compound that exhibits phosphorescence.

The light-emitting layer can be formed by dispersing a light-emitting substance in a host material, in which case it is possible to suppress crystallization and concentration quenching in which quenching reaction occurs between light-emitting substances.

When the light-emitting substance is a fluorescent compound, a substance having singlet excitation energy (the energy difference between a ground state and a singlet excited state) higher than that of the fluorescent compound is preferably used as the host material. When the light-emitting substance is a phosphorescent compound, a substance having triplet excitation energy (the energy difference between a ground state and a triplet excited state) higher than that of the phosphorescent compound is preferably used as the host material.

As the light-emitting substance dispersed in the host material, a phosphorescent compound or a fluorescent compound can be used.

Note that for the light-emitting layer, two or more kinds of host materials and a light-emitting substance may be used, or two or more kinds of light-emitting substances and a host material may be used. Alternatively, two or more kinds of host materials and two or more kinds of light-emitting substances may be used.

As the hole-injection layer, a layer that contains a substance having a high hole-transport property and a substance having an electron-accepting property can be used. The layer that contains a substance having a high hole-transport property and a substance having an electron-accepting property has a high carrier density and an excellent hole-injection property. In addition, when the layer that contains a substance having a high hole-transport property and a substance having an electron-accepting property is used as the hole-injection layer in contact with the electrode functioning as the anode, various kinds of metals, alloys, conductive compounds, mixtures thereof, or the like can be used regardless of the work function of the material of the electrode functioning as the anode The light-emitting layer, the hole-injection layer, the hole-transport layer, the electron-transport layer, and the electron-injection layer can be formed by evaporation, coating, or the like.

A passivation layer 515 may be formed over the second electrode 514 and the partition 502 by sputtering or CVD. The placement of the passivation layer 515 can reduce deterioration of the light-emitting element due to entry of moisture and oxygen into the light-emitting element from the outside. A space between the passivation layer 515 and the sealing substrate 516 may be filled with nitrogen, and further, a drying agent may be placed. Alternatively, a space between the passivation layer 515 and the sealing substrate 516 may be filled with a light-transmitting organic resin with high water absorbability.

In the case where the light-emitting element emits white light, full-color display can be performed when the substrate 503 or the sealing substrate 516 is provided with a color filter, a color conversion layer, or the like.

The substrate 503 or the sealing substrate 516 may be provided with a polarizing plate or a circular polarizing plate in order to enhance the contrast.

This embodiment can be implemented in combination with any of the structures described in the other embodiments as appropriate.

Embodiment 3

In this embodiment, structures of a transistor included in the EL display device described in the above embodiments will be described.

As examples, structures of transistors each including a semiconductor layer containing an oxide semiconductor (an oxide semiconductor layer) will be described with reference to FIGS. 6A to 6D and FIGS. 7A and 7B. FIGS. 6A to 6D and FIGS. 7A and 7B are schematic cross-sectional views of transistors.

Figure 6A:
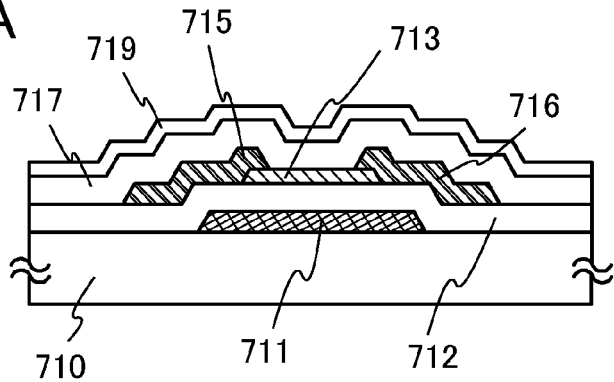
FIGS. 6A to 6D are cross-sectional views each explaining one embodiment of the present invention.

The transistor illustrated in FIG. 6A has a bottom-gate structure and is also referred to as an inverted staggered transistor.

The transistor in FIG. 6A includes a conductive layer 711 provided over a substrate 710, an insulating layer 712 provided over the conductive layer 711, an oxide semiconductor layer 713 provided over the conductive layer 711 with the insulating layer 712 placed therebetween, and a conductive layer 715 and a conductive layer 716 provided over parts of the oxide semiconductor layer 713.

FIG. 6A also illustrates an oxide insulating layer 717 in contact with another part of the oxide semiconductor layer 713 (a part where the conductive layers 715 and 716 are not provided) in the transistor, and a protective insulating layer 719 provided over the oxide insulating layer 717.

Figure 6B:
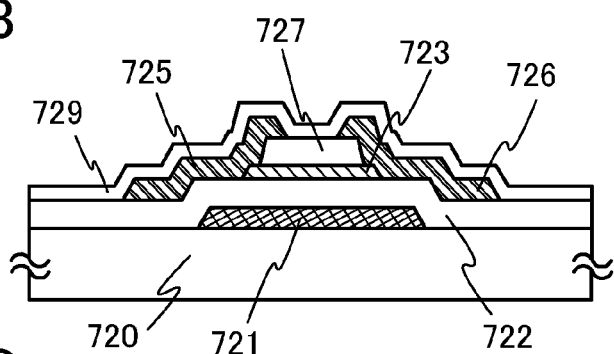

The transistor illustrated in FIG. 6B is a channel protective (channel-stop) transistor which is one of bottom-gate transistors, and is also referred to as an inverted staggered transistor.

The transistor in FIG. 6B includes a conductive layer 721 provided over a substrate 720, an insulating layer 722 provided over the conductive layer 721, an oxide semiconductor layer 723 provided over the conductive layer 721 with the insulating layer 722 placed therebetween, an insulating layer 727 provided over the conductive layer 721 with the insulating layer 722 and the oxide semiconductor layer 723 placed therebetween, and a conductive layer 725 and a conductive layer 726 provided over parts of the oxide semiconductor layer 723 and parts of the insulating layer 727.

Here, the structure in which the conductive layer 721 overlaps with part of or the entire oxide semiconductor layer 723 can suppress entry of light to the oxide semiconductor layer 723.

FIG. 6B also illustrates a protective insulating layer 729 provided over the transistor.

Figure 6C:
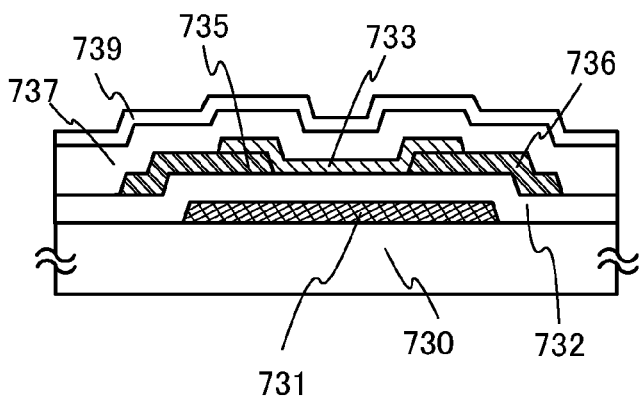

The transistor illustrated in FIG. 6C is one of bottom-gate transistors.

The transistor in FIG. 6C includes a conductive layer 731 provided over a substrate 730, an insulating layer 732 provided over the conductive layer 731, a conductive layer 735 and a conductive layer 736 provided over parts of the insulating layer 732, and an oxide semiconductor layer 733 provided over the conductive layer 731 with the insulating layer 732 and the conductive layers 735 and 736 placed therebetween.

Here, the structure in which the conductive layer 731 overlaps with part of or the entire oxide semiconductor layer 733 can suppress entry of light to the oxide semiconductor layer 733.

FIG. 6C also illustrates an oxide insulating layer 737 in contact with a top surface and side surfaces of the oxide semiconductor layer 733, and a protective insulating layer 739 provided over the oxide insulating layer 737.

Figure 6D:
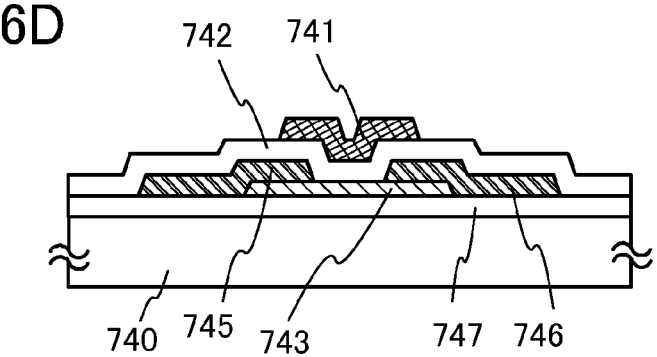

The transistor illustrated in FIG. 6D is one of top-gate transistors.

The transistor in FIG. 6D includes an oxide semiconductor layer 743 provided over a substrate 740 with an insulating layer 747 placed therebetween, a conductive layer 745 and a conductive layer 746 provided over parts of the oxide semiconductor layer 743, an insulating layer 742 provided over the oxide semiconductor layer 743 and the conductive layers 745 and 746, and a conductive layer 741 provided over the oxide semiconductor layer 743 with the insulating layer 742 placed therebetween.

Examples of the substrates 710, 720, 730 and 740 are a glass substrate (e.g., a barium borosilicate glass substrate and an aluminoborosilicate glass substrate), a substrate made of an insulator (e.g., a ceramic substrate, a quartz substrate, and a sapphire substrate), a crystallized glass substrate, a plastic substrate, and a semiconductor substrate (e.g., a silicon substrate).

The insulating layer 747 in the transistor in FIG. 6D functions as a base layer preventing diffusion of an impurity element from the substrate 740. The insulating layer 747 is formed with a single layer or a stacked layer using one or more of a silicon nitride layer, a silicon oxide layer, a silicon nitride oxide layer, a silicon oxynitride layer, an aluminum oxide layer, and an aluminum nitride oxide layer, for example. Alternatively, the insulating layer 747 may be a stack of the above-described layer and a layer of a light-blocking material. Further alternatively, the insulating layer 747 may be a layer of a light-blocking material. When a layer of a light-blocking material is used for the insulating layer 747, entry of light to the oxide semiconductor layer 743 can be suppressed.

Note that as in the transistor illustrated in FIG. 6D, the insulating layer 747 may be provided between the substrate 710 and the conductive layer 711, between the substrate 720 and the conductive layer 721, and between the substrate 730 and the conductive layer 731 in the transistors illustrated in FIGS. 6A to 6C.

The conductive layer (the conductive layers 711, 721, 731, and 741) functions as a gate of the transistor. As these conductive layers, a layer of a metal material such as molybdenum, titanium, chromium, tantalum, tungsten, aluminum, copper, neodymium, or scandium or an alloy material containing any of the metal materials as a main component is used, for example.

The insulating layer (the insulating layers 712, 722, 732, and 742) functions as a gate insulating layer of the transistor.

As the insulating layers (the insulating layers 712, 722, 732, and 742), a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, a hafnium oxide layer, or an aluminum gallium oxide layer is used, for example.

The insulating layer (the insulating layers 712, 722, 732, and 742), which functions as the gate insulating layer and is in contact with the oxide semiconductor layer (the oxide semiconductor layers 713, 723, 733, and 743), is preferably an insulating layer containing oxygen. Moreover, the insulating layer containing oxygen preferably includes a region where the proportion of oxygen is higher than that in the stoichiometric composition (such a region is also referred to as an oxygen excess region).

When the insulating layer which serves as the gate insulating layer includes the oxygen excess region, oxygen can be prevented from being transferred from the oxide semiconductor layer to the insulating layer serving as the gate insulating layer. Further, oxygen can be supplied to the oxide semiconductor layer from the insulating layer serving as the gate insulating layer. Thus, the oxide semiconductor layer, which is in contact with the insulating layer serving as the gate insulating layer, can be a layer containing a sufficient amount of oxygen.

The insulating layer (the insulating layers 712, 722, 732, and 742), which functions as the gate insulating layer, is preferably formed by a method with which impurities such as water or hydrogen do not enter the insulating layer. This is because when impurities such as hydrogen or water are included in the insulating layer serving as the gate insulating layer, the impurities such as hydrogen or water enter the oxide semiconductor layer (the oxide semiconductor layers 713, 723, 733, and 743) or oxygen in the oxide semiconductor layer is extracted by the impurities such as hydrogen or water, so that the oxide semiconductor layer might have lower resistance (have n-type conductivity) and a parasitic channel might be formed. For example, it is preferable that the insulating layer serving as the gate insulating layer be formed by sputtering and a high-purity gas from which impurities such as hydrogen or water have been removed be used as a sputtering gas.

The insulating layer serving as the gate insulating layer is preferably subjected to treatment for supplying oxygen. Examples of the treatment for supplying oxygen are heat treatment in an oxygen atmosphere and oxygen doping treatment. Alternatively, oxygen may be added by irradiation with oxygen ions accelerated by an electric field. Note that in this specification and the like, oxygen doping treatment means addition of oxygen to a bulk, and the term "bulk" is used in order to clarify that oxygen is added not only to a surface of a thin film but also to the inside of the thin film. In addition, oxygen doping includes "oxygen plasma doping" in which oxygen plasma is added to a bulk.

The treatment for supplying oxygen, such as oxygen doping treatment, is performed on the insulating layer serving as the gate insulating layer, whereby a region where the proportion of oxygen is higher than that in the stoichiometric composition is formed in the insulating layer serving as the gate insulating layer. By providing such a region, oxygen can be supplied to the oxide semiconductor layer and oxygen vacancies in the oxide semiconductor layer or at the interface between the oxide semiconductor and the insulating layer can be reduced.

For example, in the case where an aluminum gallium oxide layer is used as the insulating layer serving as the gate insulating layer, the composition $Ga_xAl_{2-x}O_{3+\alpha}$ ($0 < x < 2$, $0 < \alpha < 1$) can be obtained with treatment for supplying oxygen, such as oxygen doping treatment.

Alternatively, an oxygen gas or a mixed gas containing an inert gas (e.g., nitrogen or a rare gas such as argon) and oxygen may be introduced during the deposition of the insulating layer serving as the gate insulating layer by sputtering, whereby an oxygen excess region can be formed in the insulating layer serving as the gate insulating layer. Note that heat treatment may be performed after the deposition of the insulating layer by sputtering.

The oxide semiconductor layer (the oxide semiconductor layers 713, 723, 733, and 743) functions as a channel formation layer of the transistor. Examples of an oxide semiconductor used for these oxide semiconductor layers are an oxide of four metal elements (e.g., an In—Sn—Ga—Zn—O-based metal oxide); an oxide of three metal elements (e.g., an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, an In—Hf—Zn—O-based metal oxide, an In—La—Zn—O-based metal oxide, an In—Ce—Zn—O-based metal oxide, an In—Pr—Zn—O-based metal oxide, an In—Nd—Zn—O-based metal oxide, an In—Pm—Zn—O-based metal oxide, an In—Sm—Zn—O-based metal oxide, an In—Eu—Zn—O-based metal oxide, an In—Gd—Zn—O-based metal oxide, an In—Tb—Zn—O-based metal oxide, an In—Dy—Zn—O-based metal oxide, an In—Ho—Zn—O-based metal oxide, an In—Er—Zn—O-based metal oxide, an In—Tm—Zn—O-based metal oxide, an In—Yb—Zn—O-based metal oxide, and an In—Lu—ZnvO-based metal oxide); an oxide of two metal elements (e.g., an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Ga—O-based metal oxide, and an In—Sn—O-based metal oxide); and an In—O-based metal oxide, a Sn—O-based metal oxide, and a Zn—O-based metal oxide. Moreover, as an oxide semiconductor used for the oxide semiconductor layer, an oxide semiconductor obtained by adding silicon oxide ($SiO_2$) to the above metal oxide can also be used.

In addition, a material represented by $InMO_3(ZnO)_m$ ($m>0$) can be used as an oxide semiconductor used for the oxide semiconductor layer. Here, M represents one or more metal elements selected from Ga, Al, Mn, and Co. For example, M can be Ga, Ga and Al, Ga and Mn, or Ga and Co.

The conductive layers (the conductive layers 715 and 716, the conductive layers 725 and 726, the conductive layers 735 and 736, and the conductive layers 745 and 746) function as a source and a drain of the transistor. These conductive layers can be, for example, a layer of a metal material such as aluminum, chromium, copper, tantalum, titanium, molybdenum, or tungsten or an alloy material containing the metal material as a main component.

For example, as the conductive layer serving as the source or the drain of the transistor, a stack of a layer of a metal material such as aluminum or copper and a layer of a refractory metal material such as titanium, molybdenum, or tungsten is used. Alternatively, a stack in which a layer of a metal material such as aluminum or copper is provided between a plurality of layers of a refractory metal material is used. When an aluminum layer to which an element for preventing generation of hillocks and whiskers (e.g., silicon, neodymium, or scandium) is added is used as the conductive layer, heat resistance of the transistor can be increased.

As a material for the conductive layer, indium oxide ($In_2O_3$), tin oxide ($SnO_2$), zinc oxide (ZnO), indium oxide-tin oxide alloy ($In_2O_3$—$SnO_2$, referred to as ITO), indium oxide-zinc oxide alloy ($In_2O_3$—ZnO), or any of these metal oxides containing silicon oxide is used.

The insulating layer 727 functions as a layer for protecting the channel formation layer of the transistor (such a layer is also referred to as a channel protective layer).

The oxide insulating layers 717 and 737 are formed using an oxide insulating layer such as a silicon oxide layer, for example.

The protective insulating layers 719, 729, and 739 are formed using an inorganic insulating layer such as a silicon nitride layer, an aluminum nitride layer, a silicon nitride oxide layer, or an aluminum nitride oxide layer.

Figure 7A:
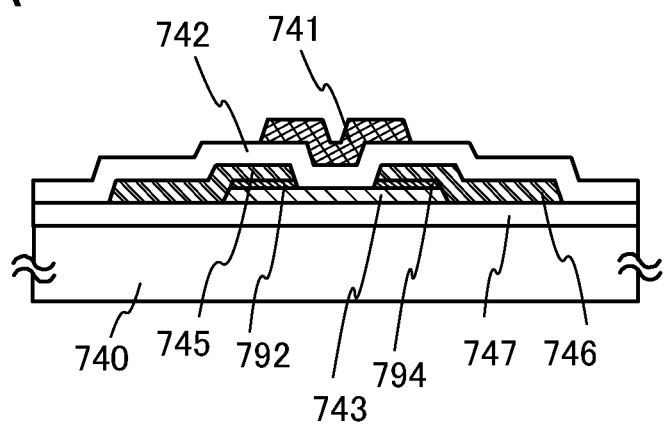
FIGS. 7A and 7B are cross-sectional views each explaining one embodiment of the present invention.

Further, an oxide conductive layer functioning as a source region and a drain region may be provided as a buffer layer between the oxide semiconductor layer 743 and the conductive layer 745 and between the oxide semiconductor layer 743 and the conductive layer 746. FIG. 7A illustrates a transistor obtained by providing oxide conductive layers in the transistor shown in FIG. 6D.

In the transistor in FIG. 7A, an oxide conductive layer 792 and an oxide conductive layer 794 that function as a source region and a drain region are formed between the oxide semiconductor layer 743 and the conductive layers 745 and 746 which function as the source and the drain. FIG. 7A shows the example in which the shape of the oxide conductive layers 792 and 794 is different from that of the conductive layers 745 and 746 according to the formation process.

In the transistor in FIG. 7A, a stack of an oxide semiconductor film and an oxide conductive film is formed and processed by one photolithography process, so that the island-shaped oxide semiconductor layer 743 and an island-shaped oxide conductive film are formed. Then, the conductive layer 745 and the conductive layer 746 which function as the source and the drain are formed over the oxide semiconductor layer 743 and the oxide conductive film. After that, the island-shaped oxide conductive film is etched using the conductive layers 745 and 746 as masks, whereby the oxide conductive layers 792 and 794 functioning as the source region and the drain region are formed.

Figure 7B:
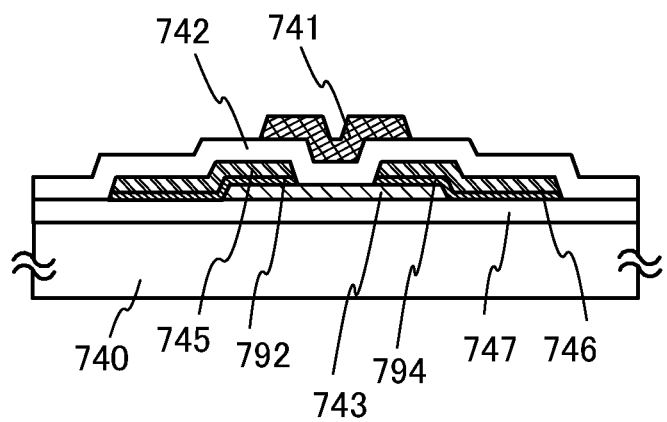

In the transistor in FIG. 7B, an oxide conductive film is formed over the oxide semiconductor layer 743, a metal conductive film is formed thereover, and the oxide conductive film and the metal conductive film are processed by one photolithography process. Thus, the oxide conductive layers 792 and 794 serving as the source region and the drain region and the conductive layers 745 and 746 serving as the source and the drain are formed.

For etching treatment for processing the shape of the oxide conductive layer, the etching conditions (e.g., the kind and concentration of etching gas or etchant, and etching time) are adjusted as appropriate to prevent excessive etching of the oxide semiconductor layer.

As the method for forming the oxide conductive layers 792 and 794, sputtering, vacuum evaporation (e.g., electron beam evaporation), arc discharge ion plating, or spray coating is used. As a material for the oxide conductive layers, zinc oxide, zinc aluminum oxide, zinc aluminum oxynitride, zinc gallium oxide, indium tin oxide containing silicon oxide (ITSO), or the like can be used. In addition, the above materials may contain silicon oxide.

By providing the oxide conductive layers as the source region and the drain region between the oxide semiconductor layer 743 and the conductive layers 745 and 746, which serve as the source and drain, the resistance of the source region and the drain region can be decreased and the transistor can be operated at high speed.

Further, the transistor can have high withstand voltage by including the oxide semiconductor layer 743, the oxide conductive layer serving as the drain region (the oxide conductive layer 792 or the oxide conductive layer 794), and the conductive layer serving as the drain (the conductive layer 745 or the conductive layer 746).

This embodiment can be implemented in combination with any of the structures described in the other embodiments as appropriate.

Embodiment 4

Figure 8A:
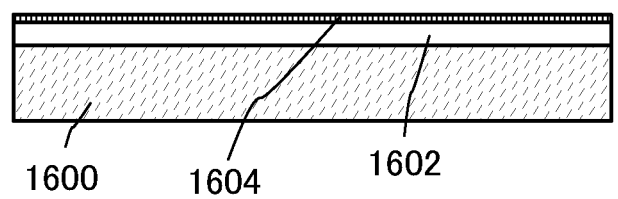
FIGS. 8A to 8C are cross-sectional views explaining one embodiment of the present invention.
Figure 8B:
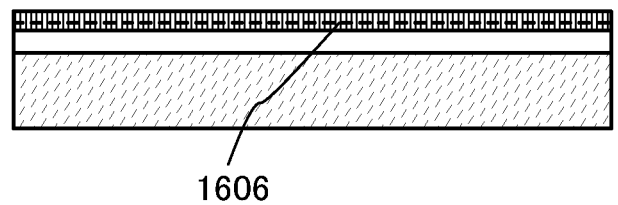

In this embodiment, an example of an oxide semiconductor that can be used for the semiconductor layer in the transistor described in the above embodiments will be described with reference to FIGS. 8A to 8C.

An oxide semiconductor layer in this embodiment has a stacked structure including a first crystalline oxide semiconductor layer and a second crystalline oxide semiconductor layer that is placed over the first crystalline oxide semiconductor layer and is thicker than the first crystalline oxide semiconductor layer.

An insulating layer 1602 is formed over an insulating layer 1600. In this embodiment, as the insulating layer 1602, an oxide insulating layer with a thickness of 50 nm to 600 nm is formed by PECVD or sputtering. For example, it is possible to use one layer or a stack of layers selected from a silicon oxide film, a gallium oxide film, an aluminum oxide film, a silicon oxynitride film, an aluminum oxynitride film, and a silicon nitride oxide film.

Next, a first oxide semiconductor film with a thickness of 1 nm to 10 nm is formed over the insulating layer 1602. The first oxide semiconductor film is formed by sputtering. The substrate temperature at the time when the first oxide semiconductor layer is deposited by sputtering is 200° C. to 400° C.

In this embodiment, a 5-nm-thick first oxide semiconductor film is formed using a target for an oxide semiconductor (a target for an In—Ga—Zn—O-based oxide semiconductor having a composition ratio of $In_2O_3$:$Ga_2O_3$:ZnO=1:1:2 [molar ratio]) under the following conditions: the distance between the substrate and the target is 160 mm, the substrate temperature is 250° C., the pressure is 0.4 Pa, the direct-current (DC) power is 0.5 kW, and the atmosphere is oxygen (the flow rate ratio of oxygen is 100%), argon (the flow rate ratio of argon is 100%), or an atmosphere containing argon and oxygen.

Next, the atmosphere in the chamber in which the substrate is put is set to a nitrogen atmosphere or dry air, and first heat treatment is performed. The temperature of the first heat treatment ranges from 400° C. to 750° C. With the first heat treatment, a first crystalline oxide semiconductor layer 1604 is formed (see FIG. 8A).

Although depending on the substrate temperature at the time of deposition or the temperature of the first heat treatment, the deposition or the first heat treatment causes crystallization from the film surface and crystals grow from the surface toward the inside, so that c-axis-oriented crystals can be obtained. With the first heat treatment, large amounts of zinc and oxygen gather at the film surface, one or a plurality of layers of a graphene-like two-dimensional crystal that is made of zinc and oxygen and has a hexagonal lattice on the top plane is/are formed on the uppermost surface, and the two-dimensional crystal grows in the thickness direction and overlaps one another to form a stack. When the temperature of the heat treatment is raised, crystal growth progresses from the surface to the inside and from the inside to the bottom.

With the first heat treatment, oxygen in the insulating layer 1602, which is an oxide insulating layer, is diffused into the interface between the first crystalline oxide semiconductor layer 1604 and the insulating layer 1602 or the vicinity of the interface (within the range of ±5 nm from the interface) to reduce oxygen vacancies in the first crystalline oxide semiconductor layer 1604. Therefore, in the insulating layer 1602 used as a base insulating layer, oxygen that is larger in proportion than the stoichiometric proportion preferably exists at least one of in the layer (in the bulk) and at the interface between the first crystalline oxide semiconductor layer 1604 and the insulating layer 1602.

Next, a second oxide semiconductor film that is thicker than 10 nm is formed over the first crystalline oxide semiconductor layer 1604. The second oxide semiconductor film is formed by sputtering at the substrate temperature of 200° C. to 400° C., in which case precursors are aligned in the oxide semiconductor layer deposited to be on and in contact with a surface of the first crystalline oxide semiconductor layer 1604, and the second oxide semiconductor layer can thus have a crystalline order.

In this embodiment, a 25-nm-thick second oxide semiconductor film is formed using a target for an oxide semiconductor (a target for an In—Ga—Zn—O-based oxide semiconductor having a composition ratio of $In_2O_3:Ga_2O_3:ZnO=1:1:2$ [molar ratio]) under the following conditions: the distance between the substrate and the target is 170 mm, the substrate temperature is 400° C., the pressure is 0.4 Pa, the direct-current (DC) power is 0.5 kW, and the atmosphere is oxygen (the flow rate ratio of oxygen is 100%), argon (the flow rate ratio of argon is 100%), or an atmosphere containing argon and oxygen.

Next, the atmosphere in the chamber in which the substrate is put is set to a nitrogen atmosphere or dry air, and second heat treatment is performed. The temperature of the second heat treatment ranges from 400° C. to 750° C. With the second heat treatment, a second crystalline oxide semiconductor layer 1606 is formed (see FIG. 8B). The second heat treatment is performed in a nitrogen atmosphere, an oxygen atmosphere, or a mixed atmosphere of nitrogen and oxygen to increase the density of the second crystalline oxide semiconductor layer and reduce defects. With the second heat treatment, crystal growth progresses in the thickness direction, that is, from the bottom to the inside, with the first crystalline oxide semiconductor layer 1604 as a nucleus; thus, the second crystalline oxide semiconductor layer 1606 is formed.

It is preferable to perform the steps from the formation of the insulating layer 1602 to the second heat treatment successively without exposure to the air. The atmosphere for the steps from the formation of the insulating layer 1602 to the second heat treatment is preferably controlled to be an atmosphere that hardly contains hydrogen and moisture (e.g., an inert atmosphere, a reduced pressure atmosphere, or a dry air atmosphere). For example, a dry nitrogen atmosphere with a dew point of −40° C. or lower, preferably −50° C. or lower is used.

Figure 8C:
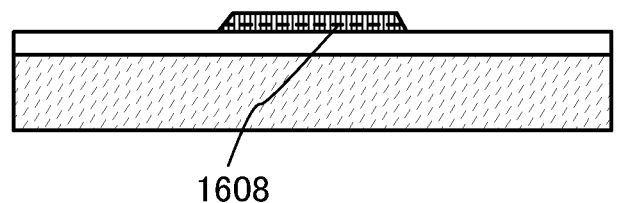

Next, the oxide semiconductor stack including the first crystalline oxide semiconductor layer 1604 and the second crystalline oxide semiconductor layer 1606 is processed so that an oxide semiconductor layer 1608 made of the island-shaped oxide semiconductor stack is formed (see FIG. 8C). In FIGS. 8B and 8C, the interface between the first crystalline oxide semiconductor layer 1604 and the second crystalline oxide semiconductor layer 1606 is shown by doted lines to indicate the oxide semiconductor stack; a clear interface does not exist and FIGS. 8B and 8C show the interface for easy understanding.

The oxide semiconductor stack can be processed by etching after a mask with a desired shape is formed over the oxide semiconductor stack. The mask may be formed by photolithography, ink jet printing, or the like.

For the etching of the oxide semiconductor stack, either wet etching or dry etching can be employed. Needless to say, both of them may be employed in combination.

One of features of the first and second crystalline oxide semiconductor layers obtained by the above formation method is that c-axes of crystals therein are oriented. Note that the first and second crystalline oxide semiconductor layers layer include an oxide including a crystal having c-axis alignment (also referred to as c-axis aligned crystal (CAAC)), which has neither a single crystal structure nor an amorphous structure. Parts of the first and second crystalline oxide semiconductor layers include crystal grains.

In any case, in order to obtain CAAC, it is important to form hexagonal crystals at an initial stage of deposition of an oxide semiconductor film and to cause crystal growth from the hexagonal crystals as seeds. For that purpose, the substrate heating temperature is preferably 100° C. to 500° C., more preferably 200° C. to 400° C., further preferably 250° C. to 300° C. In addition, by performing heat treatment on the deposited oxide semiconductor film at a temperature higher than the substrate heating temperature at the time of the deposition, microdefects in the film and defects at the interface between the stacked first oxide semiconductor layer and second oxide semiconductor layer can be repaired.

The first and second crystalline oxide semiconductor layers are formed using an oxide semiconductor material containing at least Zn, for example, an oxide of four metal elements, such as an In—Al—Ga—Zn—O-based material or an In—Sn—Ga—Zn—O-based material; an oxide of three metal elements, such as an In—Ga—Zn—O-based material, an In—Al—Zn—O-based material, an In—Sn—Zn—O-based material, a Sn—Ga—Zn—O-based material, an Al—Ga—Zn—O-based material, or a Sn—Al—Zn—O-based material; an oxide of two metal elements, such as an In—Zn—O-based material, a Sn—Zn—O-based material, an Al—Zn—O-based material, or a Zn—Mg—O-based material; or a Zn—O-based material. Moreover, an In—Si—Ga—Zn—O-based material, an In—Ga—B—Zn—O-based material, or an In—B—Zn—O-based material may be used. In addition, the above materials may contain $SiO_2$. For example, an In—Ga—Zn—O-based material means an oxide containing indium (In), gallium (Ga), and zinc (Zn). There is no particular limitation on the composition ratio. The In—Ga—Zn—O-based material may contain an element other than In, Ga, and Zn.

Note that it has been pointed out that an oxide semiconductor is insensitive to impurities and there is no problem when a considerable amount of metal impurities are contained in the film; therefore, soda-lime glass which contains a large amount of alkali metal such as sodium and is inexpensive can also be used (Kamiya, Nomura, and Hosono, "Carrier Transport Properties and Electronic Structures of Amorphous Oxide Semiconductors: The present status", *KOTAI BUTSURI (SOLID STATE PHYSICS)*, 2009, Vol. 44, pp. 621-633). However, such consideration is not appropriate. Alkali metal is not an element included in an oxide semiconductor and is therefore an impurity. Furthermore, alkaline earth metal is an impurity in the case where alkaline earth metal is not included in an oxide semiconductor. Alkali metal, in particular, Na becomes $Na^+$ when an insulating film in contact with the oxide semiconductor film is an oxide and Na diffuses into the insulating layer. In addition, in the oxide semiconductor film, Na cuts or enters a bond between metal and oxygen which are included in an oxide semiconductor. As a result, for example, deterioration of characteristics of a transistor, such as a normally-on state of the transistor due to shift of the threshold voltage in the negative direction, or reduction in mobility, occurs. Further, variation in characteristics also occurs. Such deterioration of characteristics of the transistor and variation in characteristics due to the impurity remarkably appear when the hydrogen concentration in the oxide semiconductor film is very low. Therefore, when the hydrogen concentration in the oxide semiconductor film is less than or equal to $5 \times 10^{19}/cm^3$, particularly less than or equal to $5 \times 10^{18}/cm^3$, the concentration of the above impurity is preferably reduced. Specifically, the measurement value of the Na concentration by secondary ion mass spectrometry is less than or equal to $5 \times 10^{16}/cm^3$, preferably less than or equal to $1 \times 10^{16}/cm^3$, further preferably less than or equal to $1 \times 10^{15}/cm^3$. Similarly, the measurement value of the Li concentration is less than or equal to $5 \times 10^{15}/cm^3$, preferably less than or equal to $1 \times 10^{15}/cm^3$. Similarly, the measurement value of the K concentration is less than or equal to $5 \times 10^{15}/cm^3$, preferably less than or equal to $1 \times 10^{15}/cm^3$.

Without limitation to the two-layer structure in which the second crystalline oxide semiconductor layer is formed over the first crystalline oxide semiconductor layer, it is possible to employ a stacked structure including three or more layers, by conducting or repeating the steps of deposition process and heat treatment for forming a third crystalline oxide semiconductor layer after the formation of the second crystalline oxide semiconductor layer.

The oxide semiconductor layer 1608 including the stack of the oxide semiconductor layers formed by the above formation method can be used as appropriate for a transistor applicable to the EL display device disclosed in this specification (e.g., the transistor described in Embodiments 2 and 3).

In the transistor illustrated in FIG. 6D in Embodiment 3 in which the stack of the first and second crystalline oxide semiconductor layers in this embodiment is used as the oxide semiconductor layer, an electric field is not applied from one surface to the other surface of the oxide semiconductor layer. Further, current does not flow in the thickness direction of the oxide semiconductor stack (i.e., the direction from one surface to the other surface, specifically the vertical direction in FIG. 6D). The transistor has a structure in which current mainly flows along the interface between the oxide semiconductor stack and the gate insulating layer; therefore, even when the transistor is irradiated with light or even when a BT stress is applied to the transistor, deterioration of transistor characteristics is suppressed or reduced.

A highly reliable transistor with stable electrical characteristics can be realized because the transistor includes a stack of a first crystalline oxide semiconductor layer and a second crystalline oxide semiconductor layer like the oxide semiconductor layer 1608.

Since a transistor including polycrystalline silicon requires a process for crystallization with laser light irradiation, variation in transistor characteristics is caused and thus adversely affects display of an EL display device. In contrast, the transistor including the oxide semiconductor described in this embodiment does not need a laser crystallization process, which means that one of causes of variation in transistor characteristics can be eliminated. Thus, the image quality of an EL display device can be increased.

This embodiment can be implemented in combination with any of the structures described in the other embodiments as appropriate.

Embodiment 5

The EL display device disclosed in this specification can be applied to a variety of electronic devices (including game machines). Examples of electronic devices are a television set (also referred to as a television or a television receiver), a monitor of a computer or the like, a camera such as a digital camera and a digital video camera, a digital photo frame, a mobile phone handset (also referred to as a mobile phone or a mobile phone device), a portable game machine, a personal digital assistant, an audio reproducing device, and a large-sized game machine such as a pachinko machine.

Examples of electronic devices each including the EL display device including the monitor circuit described in Embodiment 1 will be described.

Figure 9A:
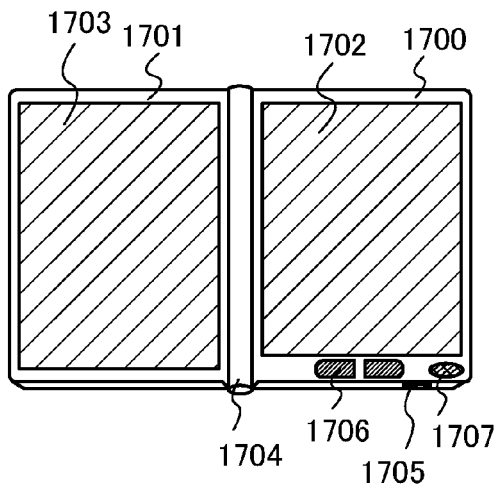
FIGS. 9A to 9D are diagrams each explaining one embodiment of the present invention.

FIG. 9A illustrates an example of an e-book reader. The e-book reader in FIG. 9A includes two housings of a housing 1700 and a housing 1701. The housing 1700 and the housing 1701 are combined with a hinge 1704 so that the e-book reader can be opened and closed. With such a structure, the e-book reader can be operated like a paper book.

A display portion 1702 and a display portion 1703 are incorporated in the housing 1700 and the housing 1701, respectively. The display portion 1702 and the display portion 1703 may be configured to display one image or different images. In the case where the display portions 1702 and 1703 display different images, the display portion on the right side (the display portion 1702 in FIG. 9A) can display text and the display portion on the left side (the display portion 1703 in FIG. 9A) can display images, for example.

FIG. 9A illustrates an example in which the housing 1700 is provided with an operation unit and the like. For example, the housing 1700 is provided with a power supply input terminal 1705, an operation key 1706, a speaker 1707, and the like. Pages can be turned with the operation key 1706. Note that a keyboard, a pointing device, or the like may be provided on the surface of the housing, on which the display portion is provided. Further, an external connection terminal (e.g., an earphone terminal, a USB terminal, or a terminal that can be connected to various cables such as a USB cable), a recording medium insertion portion, or the like may be provided on the back surface or the side surface of the housing. Further, the e-book reader in FIG. 9A may have a function of an electronic dictionary.

Figure 9B:
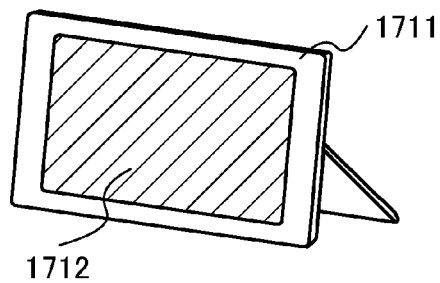

FIG. 9B illustrates an example of a digital photo frame including the EL display device disclosed in this specification. For example, in the digital photo frame in FIG. 9B, a display portion 1712 is incorporated in a housing 1711. The display portion 1712 can display a variety of images. For example, the display portion 1712 can display an image taken with a digital camera or the like and function as a normal photo frame.

Note that the digital photo frame in FIG. 9B may be provided with an operation unit, an external connection terminal (e.g., a USB terminal or a terminal that can be connected to a variety of cables such as a USB cable), a recording medium insertion portion, and the like. Although these components may be provided on the surface on which the display portion is provided, it is preferable to provide them on the side surface or the back surface for the design of the digital photo frame. For example, a memory that stores an image taken with a digital camera is inserted in the recording medium insertion portion of the digital photo frame, and the image can be transferred and displayed on the display portion 1712.

Figure 9C:
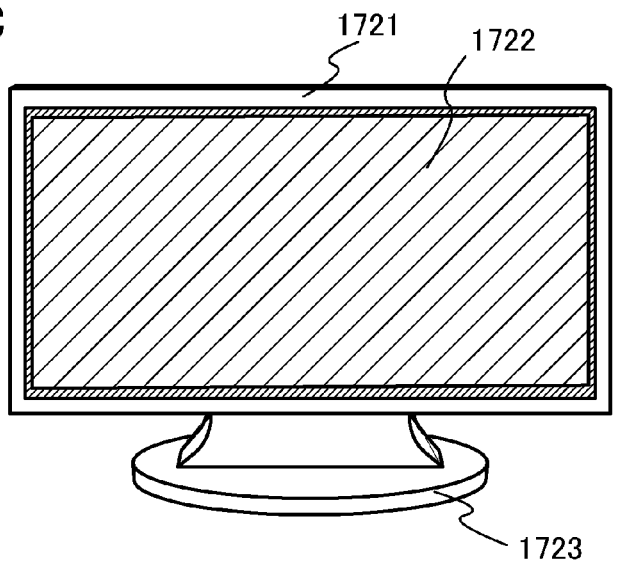

FIG. 9C illustrates an example of a television set including the EL display device. In the television set in FIG. 9C, a display portion 1722 is incorporated in a housing 1721. The display portion 1722 can display images. Further, the housing 1721 is supported by a stand 1723 here. The EL display device described in any of the above embodiments can be used in the display portion 1722.

The television set in FIG. 9C can be operated with an operation switch of the housing 1721 or a separate remote controller. With operation keys of the remote controller, channels and volume can be controlled and an image displayed on the display portion 1722 can be controlled. Further, the remote controller may be provided with a display portion for displaying data output from the remote controller.

Figure 9D:
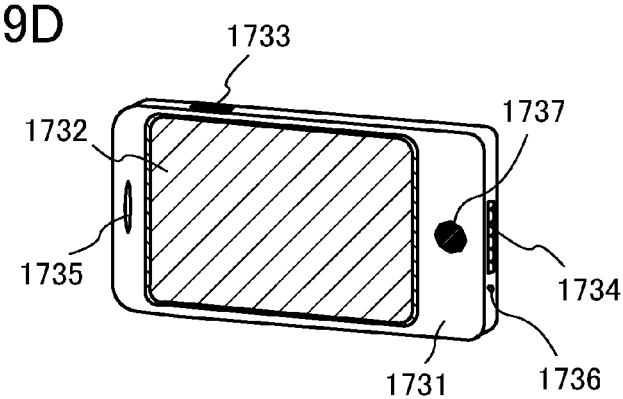
Figure 10A:
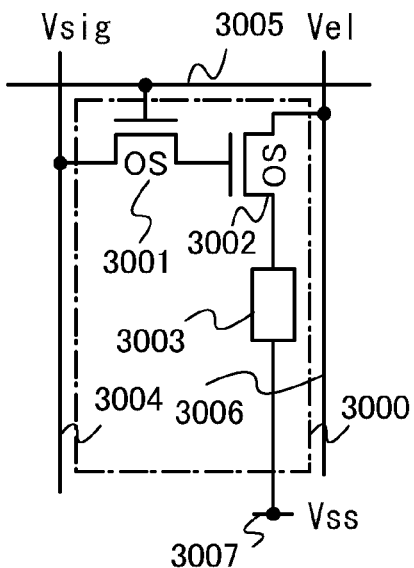
FIGS. 10A to 10C are diagrams for explaining a problem of the present invention.
Figure 10B:
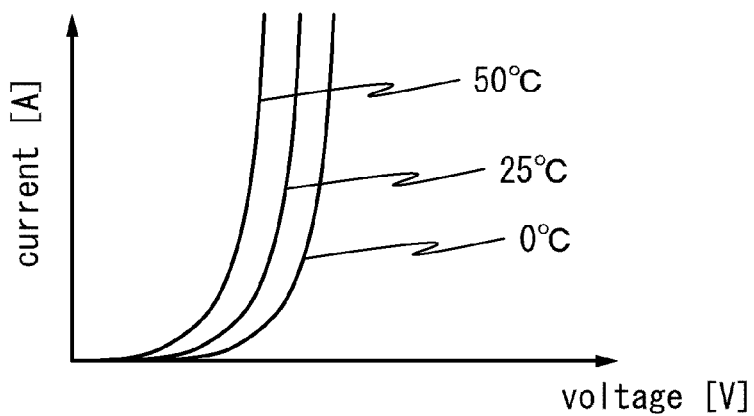
Figure 10C:
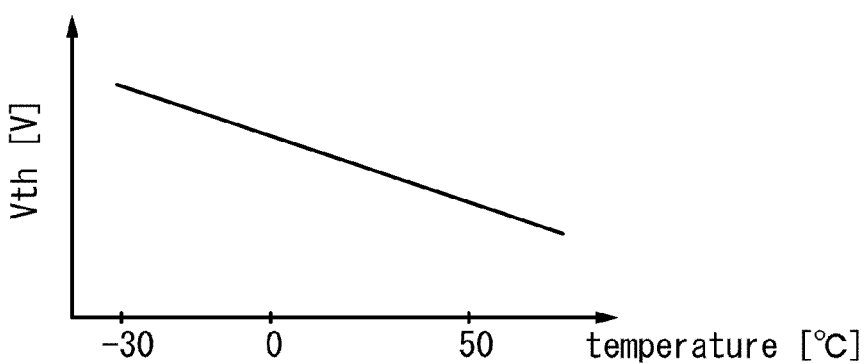

FIG. 9D illustrates an example of a mobile phone including the EL display device disclosed in this specification. The mobile phone in FIG. 9D is provided with a display portion 1732 incorporated in a housing 1731, an operation button 1733, an operation button 1737, an external connection port 1734, a speaker 1735, a microphone 1736, and the like. The display portion 1732 of the mobile phone in FIG. 9D is a touch panel. By touching the display portion 1732 with a finger or the like, contents displayed on the display portion 1732 can be controlled. Further, operations such as making calls and texting can be performed by touching the display portion 1732 with a finger or the like.

This embodiment can be implemented in combination with any of the structures described in the other embodiments as appropriate.

This application is based on Japanese Patent Application serial No. 2010-200435 filed with Japan Patent Office on Sep. 8, 2010, the entire contents of which are hereby incorporated by reference.

What is claimed is:

1. An EL display device comprising:
    a monitor circuit comprising:
        a monitor power supply line,
        a monitor transistor comprising a first terminal electrically connected to the monitor power supply line and a gate electrically connected to the monitor power supply line,
        a monitor light-emitting element comprising a first electrode electrically connected to a second terminal of the monitor transistor,
        a current source circuit electrically connected to a second electrode of the monitor light-emitting element, and
        an amplification circuit comprising an input terminal electrically connected to the second electrode of the monitor light-emitting element; and
    a pixel comprising:
        a light-emitting element comprising a first electrode electrically connected to an output terminal of the amplification circuit, and
        a driving transistor comprising a first terminal electrically connected to a second electrode of the light-emitting element, a second terminal electrically connected to a power supply line, and a gate electrically connected to a signal line,
    wherein each of the monitor transistor and the driving transistor comprises a semiconductor layer comprising an oxide semiconductor, and
    wherein a potential of the monitor power supply line is lower than a potential of the power supply line.

2. The EL display device according to claim 1, wherein each of the driving transistor and the monitor transistor is configured to operate in a saturation region.

3. The EL display device according to claim 1, wherein the pixel comprises a capacitor comprising a first electrode electrically connected to the power supply line, and a second electrode electrically connected to the gate of the driving transistor.

4. The EL display device according to claim 1, wherein each of the driving transistor and the monitor transistor is an n-channel transistor.

5. The EL display device according to claim 1, wherein a potential of the output terminal of the amplification circuit is lower than the potential of the monitor power supply line and the potential of the power supply line.

6. An electronic device comprising the EL display device according to claim 1.

7. An EL display device comprising:
    a first monitor circuit comprising:
        a first monitor power supply line,
        a first monitor transistor comprising a first terminal electrically connected to the first monitor power supply line and a gate electrically connected to the first monitor power supply line,
        a first monitor light-emitting element comprising a first electrode electrically connected to a second terminal of the first monitor transistor,
        a first current source circuit electrically connected to a second electrode of the first monitor light-emitting element, and
        a first amplification circuit comprising an input terminal electrically connected to the second electrode of the first monitor light-emitting element;
    a second monitor circuit comprising:
        a second monitor power supply line,
        a second monitor transistor comprising a first terminal electrically connected to the second monitor power supply line and a gate electrically connected to the second monitor power supply line,
        a second monitor light-emitting element comprising a first electrode electrically connected to a second terminal of the second monitor transistor,
        a second current source circuit electrically connected to a second electrode of the second monitor light-emitting element, and
        a second amplification circuit comprising an input terminal electrically connected to the second electrode of the second monitor light-emitting element;
    a first pixel comprising:
        a first light-emitting element comprising a first electrode electrically connected to an output terminal of the first amplification circuit, and
        a first driving transistor comprising a first terminal electrically connected to a second electrode of the first light-emitting element, a second terminal electrically connected to a first power supply line, and a gate electrically connected to a first signal line; and
    a second pixel comprising:
        a second light-emitting element comprising a first electrode electrically connected to an output terminal of the second amplification circuit, and
        a second driving transistor comprising a first terminal electrically connected to a second electrode of the second light-emitting element, a second terminal electrically connected to a second power supply line, and a gate electrically connected to a second signal line, wherein each of the first monitor transistor, the second monitor transistor, the first driving transistor, and the second driving transistor comprises a semiconductor layer comprising an oxide semiconductor, wherein a potential of the first monitor power supply line is lower than a potential of the first power supply line, and wherein a potential of the second monitor power supply line is lower than a potential of the second power supply line.

8. The EL display device according to claim 7, wherein each of the first light-emitting element and the first monitor light-emitting element comprises a first light-emitting material, wherein each of the second light-emitting element and the second monitor light-emitting element comprises a second light-emitting material, and wherein the potential of the first power supply line and the potential of the second power supply line are different from each other.

9. The EL display device according to claim 8, wherein each of the first driving transistor, the second driving transistor, the first monitor transistor, and the second monitor transistor is configured to operate in a saturation region.

10. The EL display device according to claim 8, wherein the first pixel comprises a first capacitor comprising a first electrode electrically connected to the first power supply line, and a second electrode electrically connected to the gate of the first driving transistor, and wherein the second pixel comprises a second capacitor comprising a first electrode electrically connected to the second power supply line, and a second electrode electrically connected to the gate of the second driving transistor.

11. The EL display device according to claim 8, wherein each of the first driving transistor, the second driving transistor, the first monitor transistor, and the second monitor transistor is an n-channel transistor.

12. The EL display device according to claim 8, wherein a potential of the output terminal of the first amplification circuit is lower than the potential of the first monitor power supply line and the potential of the first power supply line, and wherein a potential of the output terminal of the second amplification circuit is lower than the potential of the second monitor power supply line and the potential of the second power supply line.

13. An electronic device comprising the EL display device according to claim 8.

14. An EL display device comprising:
a monitor circuit comprising:
 a monitor power supply line,
 a monitor transistor comprising a first terminal electrically connected to the monitor power supply line and a gate electrically connected to the monitor power supply line,
 a monitor light-emitting element comprising a first electrode electrically connected to a second terminal of the monitor transistor,
 a current source circuit electrically connected to a second electrode of the monitor light-emitting element, and
 an amplification circuit comprising an input terminal electrically connected to the second electrode of the monitor light-emitting element; and
a pixel comprising:
 a light-emitting element comprising a first electrode electrically connected to an output terminal of the amplification circuit, and
 a driving transistor comprising a first terminal electrically connected to a second electrode of the light-emitting element, a second terminal electrically connected to a power supply line, and a gate electrically connected to a signal line,
wherein each of the monitor transistor and the driving transistor comprises a semiconductor layer comprising an oxide semiconductor,
wherein a potential of the monitor power supply line is lower than a potential of the power supply line,
wherein each of the monitor transistor and the driving transistor is formed over a first substrate, and
wherein the amplification circuit is formed over a second substrate.

15. The EL display device according to claim 14, wherein each of the driving transistor and the monitor transistor is configured to operate in a saturation region.

16. The EL display device according to claim 14, wherein the pixel comprises a capacitor comprising a first electrode electrically connected to the power supply line, and a second electrode electrically connected to the gate of the driving transistor.

17. The EL display device according to claim 14, wherein each of the driving transistor and the monitor transistor is an n-channel transistor.

18. The EL display device according to claim 14, wherein a potential of the output terminal of the amplification circuit is lower than the potential of the monitor power supply line and the potential of the power supply line.

19. An electronic device comprising the EL display device according to claim 14.

* * * * *